US012761040B2

(12) United States Patent
Toyoura

(10) Patent No.: US 12,761,040 B2
(45) Date of Patent: Oct. 13, 2026

(54) INFORMATION PROCESSING APPARATUS, INFORMATION PROCESSING METHOD, AND COMPUTER PROGRAM

(71) Applicant: Sony Group Corporation, Tokyo (JP)

(72) Inventor: Masataka Toyoura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 70 days.

(21) Appl. No.: 18/567,027

(22) PCT Filed: Feb. 15, 2022

(86) PCT No.: PCT/JP2022/005807
§ 371 (c)(1),
(2) Date: Dec. 5, 2023

(87) PCT Pub. No.: WO2022/259621
PCT Pub. Date: Dec. 15, 2022

(65) Prior Publication Data
US 2024/0271956 A1 Aug. 15, 2024

(30) Foreign Application Priority Data
Jun. 11, 2021 (JP) ................................ 2021-098270

(51) Int. Cl.
*G01C 21/00* (2006.01)

(52) U.S. Cl.
CPC ................................ *G01C 21/3804* (2020.08)

(58) Field of Classification Search
CPC ................................................ G01C 21/3804
See application file for complete search history.

(56) References Cited

U.S. PATENT DOCUMENTS

2017/0010100 A1* 1/2017 Takeuchi ............. G05D 1/0276
2020/0003897 A1 1/2020 Shroff
2020/0241554 A1* 7/2020 Takahashi ............ G05D 1/0274
2023/0298301 A1* 9/2023 Margines ............ B60W 60/001
382/104

FOREIGN PATENT DOCUMENTS

CN 107145578 A 9/2017
CN 110858954 A 3/2020
JP 2014-089740 A 5/2014
(Continued)

OTHER PUBLICATIONS

International Search Report and Written Opinion mailed on May 10, 2022, received for PCT Application PCT/JP2022/005807, filed on Feb. 15, 2022, 9 pages including English Translation.

*Primary Examiner* — Adnan M Mirza
(74) *Attorney, Agent, or Firm* — XSENSUS LLP

(57) ABSTRACT

There is provided an information processing apparatus that can reduce the processing burden or the memory usage. An information processing apparatus includes: a sensor-information analysis unit configured to analyze sensor information and create map base data that is data used for updating an environment map including environment information; a map accumulation unit configured to hold the environment map and update the environment map on the basis of the map base data; and a map analysis unit configured to analyze the environment map and compensate for or correct the environment information in the environment map.

11 Claims, 19 Drawing Sheets

(56) References Cited

FOREIGN PATENT DOCUMENTS

| | | | |
|---|---|---|---|
| JP | 2017-021791 | A | 1/2017 |
| JP | 2017-090958 | A | 5/2017 |
| JP | 2017-194527 | A | 10/2017 |
| JP | 2020-087248 | A | 6/2020 |
| WO | WO-2018016394 | A1 | 1/2018 |
| WO | 2018/193582 | A1 | 10/2018 |
| WO | 2019/069524 | A1 | 4/2019 |

* cited by examiner

INFORMATION PROCESSING APPARATUS, INFORMATION PROCESSING METHOD, AND COMPUTER PROGRAM

CROSS-REFERENCE TO RELATED APPLICATIONS

The present application is based on PCT filing PCT/JP2022/005807, filed Feb. 15, 2022, which claims priority from Japanese Patent Application No. 2021-098270, filed Jun. 11, 2021, the entire contents of each are incorporated herein by reference.

TECHNICAL FIELD

The present disclosure relates to an information processing apparatus, an information processing method, and a computer program.

BACKGROUND ART

In a technical field of automatic movement of a mobile object, such as autonomous traveling of a robot and automated driving of an automobile, there is known a technology of creating an environment map from environment information around a mobile object acquired by a sensor such as LiDAR, and preparing action planning of the mobile object on the basis of the environment map (see Patent Document 1).

CITATION LIST

Patent Document

Patent Document 1: Japanese Patent Application Laid-Open No. 2020-87248

SUMMARY OF THE INVENTION

Problems to be Solved by the Invention

In order to prepare high-accuracy action planning for automatic movement of a mobile object, it is necessary to make an environment map more detailed. However, to make an environment map more detailed results in an increase in the processing load and the memory usage of a computer that creates the environment map and prepares the action planning. Furthermore, an increase in the number of types of, or the number of, sensors provided in the mobile object causes an increase in costs.

In view of such circumstances, an object of the present disclosure is to provide an information processing apparatus, an information processing method, and a computer program that can reduce the processing load or the memory usage.

Solutions to Problems

An information processing apparatus according to one aspect of the present disclosure includes: a sensor-information analysis unit configured to analyze sensor information and create map base data that is data used for updating an environment map including environment information; a map accumulation unit configured to hold the environment map and update the environment map on the basis of the map base data; and a map analysis unit configured to analyze the environment map and compensate for or correct the environment information in the environment map.

The map analysis unit compensates for a missing part of the environment information in the environment map. The map analysis unit estimates content of a missing part of a predetermined kind of environment information by evaluating continuity of another kind of environment information, and provides the estimated content as compensation for the missing part. The map analysis unit compensates for the missing part of the environment information in a format in which the environment information compensated for by the map analysis unit can be identified.

An information processing apparatus according to another aspect of the present disclosure includes: a sensor-information analysis unit configured to analyze sensor information and create map base data that is data used for updating an environment map including environment information; and a map accumulation unit configured to hold the environment map and update the environment map on the basis of the map base data, in which the sensor-information analysis unit creates first map base data having a first range and first resolution and a second map base data having a second range wider than the first range and second resolution lower than the first resolution, and the map accumulation unit includes a first map accumulation unit configured to update a first environment map having a third range and the first resolution on the basis of the first map base data, and a second map accumulation unit configured to update a second environment map having a fourth range wider than the third range and the second resolution on the basis of the second map base data.

The second map base data does not include at least a part of data in a region overlapping the first map base data, and the second map accumulation unit updates the second environment map on the basis of environment information in the first environment map and the second map base data.

The information processing apparatus further includes an action planning unit configured to prepare action planning of a mobile object, in which the action planning unit selects one of the first environment map and the second environment map according to a situation, and prepares the action planning on the basis of the selected environment map. The action planning unit prepares the action planning on the basis of the second environment map, and prepares the action planning on the basis of the first environment map in a case where it is determined that more accurate action planning is necessary.

An information processing method according to one aspect of the present disclosure includes: a step of acquiring sensor information; a step of analyzing the sensor information and creating map base data that is data used for updating an environment map including environment information; a step of updating the environment map on the basis of the map base data; and a step of analyzing the environment map, to compensate for or correct the environment information in the environment map.

An information processing method according to another aspect of the present disclosure includes: a step of acquiring sensor information; a step of analyzing the sensor information and creating map base data that is data used for updating an environment map including environment information; and a step of updating the environment map on the basis of the map base data, in which the step of creating the map base data includes a step of creating first map base data having a first range and first resolution and a step of creating second map base data having a second range wider than the first range and second resolution lower than the first resolution, and the step of updating the environment map includes a step of updating a first environment map having a third range and the first resolution on the basis of the first map base data, and a step of updating a second environment map having a fourth range wider than the third range and the second resolution on the basis of the second map base data.

A computer program according to one aspect of the present disclosure causes a computer to perform: a step of acquiring sensor information; a step of analyzing the sensor information and creating map base data that is data used for updating an environment map including environment information; a step of updating the environment map on the basis of the map base data; and a step of analyzing the environment map, to compensate for or correct the environment information in the environment map.

A computer program according to another aspect of the present disclosure causes a computer to perform: a step of acquiring sensor information; a step of analyzing the sensor information and creating map base data that is data used for updating an environment map including environment information; and a step of updating the environment map on the basis of the map base data, in which the step of creating the map base data includes a step of creating first map base data having a first range and first resolution and a step of creating second map base data having a second range wider than the first range and second resolution lower than the first resolution, and the step of updating the environment map includes a step of updating a first environment map having a third range and the first resolution on the basis of the first map base data, and a step of updating a second environment map having a fourth range wider than the third range and the second resolution on the basis of the second map base data.

MODE FOR CARRYING OUT THE INVENTION

Figure 1:
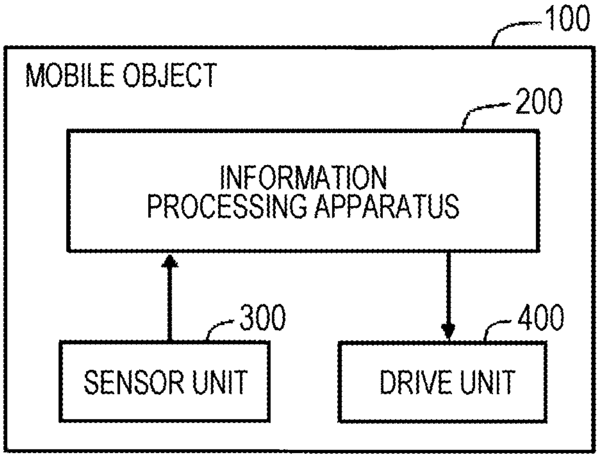
FIG. 1 is a block diagram illustrating an example of a configuration of a mobile object including an information processing apparatus according to the present embodiment.

Below, one of embodiments of the present disclosure (hereinafter referred to as the present embodiment) will be described with reference to the drawings. The description will be given in the following order.

1. Example of configuration of information processing apparatus
2. Example of operations of information processing apparatus
3. Modifications
4. Example of hardware configuration
5. Example of application to vehicle control system
6. Conclusion

1. Example of Configuration of Information Processing Apparatus

First, an example of a configuration of an information processing apparatus 200 according to the present embodiment will be described.

(Mobile Object)

FIG. 1 is a block diagram illustrating an example of a configuration of a mobile object 100 including the information processing apparatus 200 according to the present embodiment.

Note that, in the following drawings including FIG. 1, an arrow attached to a straight line connecting the respective units indicates a main flow of data or the like, and a control signal or the like flows in a direction opposite to the arrow in some cases.

The mobile object 100 includes a sensor unit 300, the information processing apparatus 200, and a drive unit 400.

The mobile object 100 is an apparatus that automatically moves. For example, the mobile object 100 is an autonomous mobile robot or an automated driving car. Alternatively, the mobile object 100 may be a flying object such as a drone. Alternatively, the mobile object 100 may be an object attached to a moving unit such as a robot arm included in an apparatus.

The sensor unit 300 senses environment around the mobile object 100 with the use of a sensor 310, to acquire sensor information.

Figure 2:
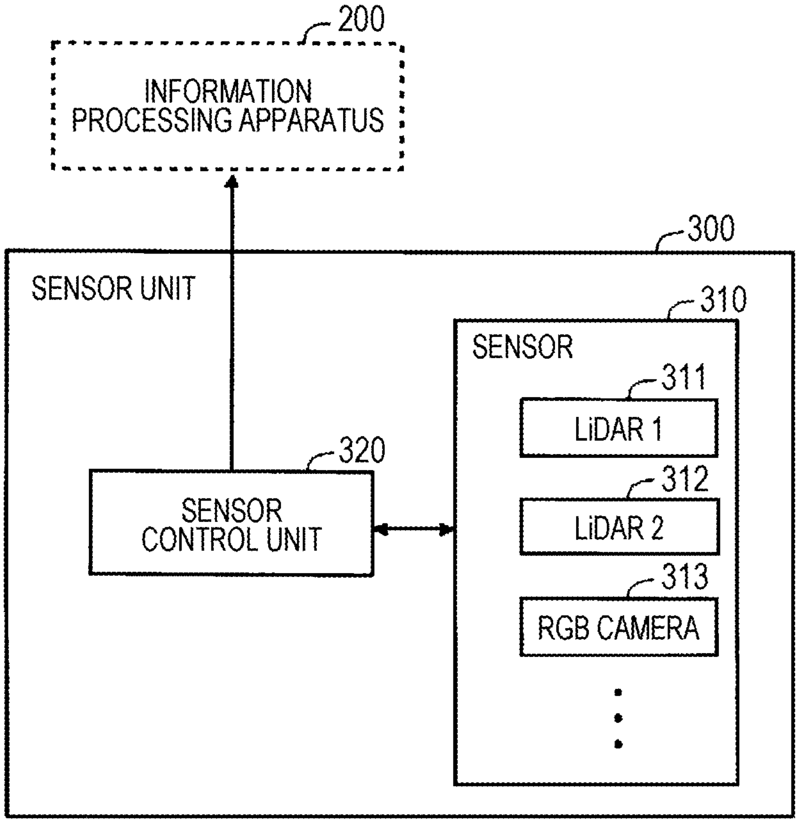
FIG. 2 is a block diagram illustrating an example of a configuration of a sensor unit.

FIG. 2 is a block diagram illustrating an example of a configuration of the sensor unit 300.

The sensor unit 300 includes the sensor 310 and a sensor control unit 320.

For example, the sensor 310 is a light detection and ranging sensor (LiDAR), an RGB camera, a radar, an ultrasonic sensor, or a global positioning system (GPS) sensor. In the example illustrated in FIG. 2, the sensor unit 300 includes a first light-detection-and-ranging sensor (LiDAR) 311, a second LiDAR 312, and an RGB camera 313, as the sensors 310.

The type and the number of sensors 310 are not limited to any specific type or number, but at least a sensor capable of detecting a position of an object is required. Furthermore, in a process of analyzing an environment map 500 described later, two or more kinds of environment information are required in addition to information about a position of an object. Hence, two or more types of sensors 310 having different characteristics are required.

The sensor control unit 320 controls those sensors 310 and transmits sensor information acquired by those sensors 310 to the information processing apparatus 200. Furthermore, it is preferable that the sensor control unit 320 applies an appropriate noise filter to remove noises in sensor information and then transmits the sensor information to the information processing apparatus 200.

The information processing apparatus 200 creates the environment map 500 from the sensor information acquired by the sensor unit 300, and prepares action planning of the mobile object 100 on the basis of the environment map 500. An example of a configuration of the information processing apparatus 200 will be described later.

The drive unit 400 moves the mobile object 100 so as to follow the action planning prepared by the information processing apparatus 200. The drive unit 400 includes, for example, a motor.

(Environment Map)

The environment map 500 is a map describing the surrounding environment of the mobile object 100. The environment map 500 includes environment information that is information regarding the surrounding environment of the mobile object 100.

Figure 3A:
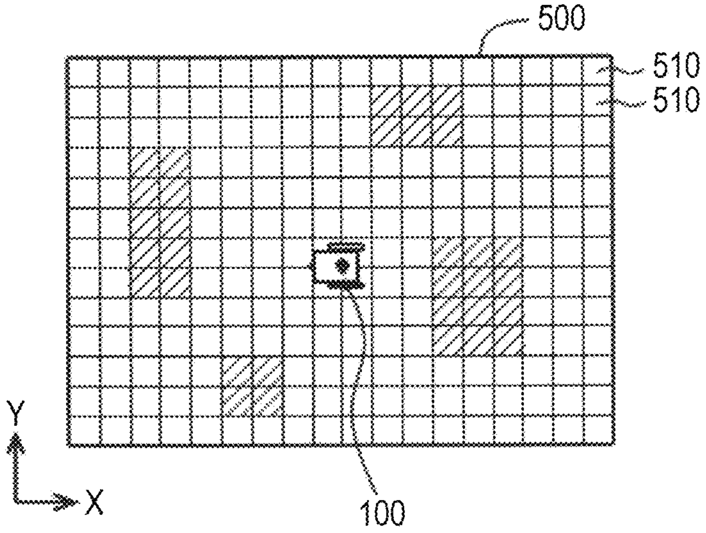
FIG. 3A is a view illustrating an example of an environment map, illustrating voxels arranged in a horizontal plane.
Figure 3B:
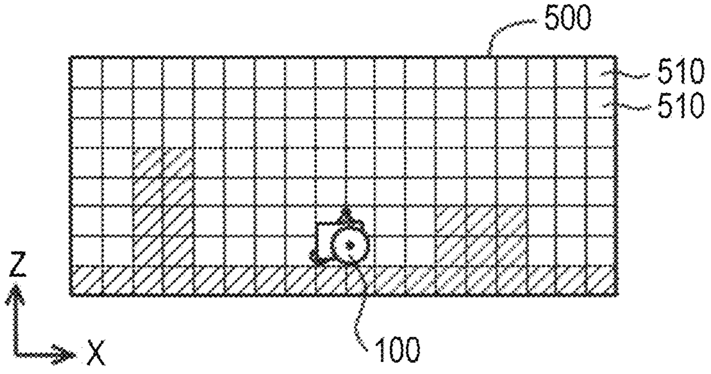
FIG. 3B is a view illustrating an example of an environment map, illustrating voxels arranged in a vertical plane.

FIGS. 3A and 3B are views illustrating an example of the environment map 500. FIG. 3A illustrates voxels 510 arranged in a horizontal plane extending across the mobile object 100. FIG. 3B illustrates voxels 510 arranged in a vertical plane extending across the mobile object 100.

Note that, in the following drawings including FIGS. 3A and 3B, two directions perpendicular to each other in a horizontal plane are defined as an X direction and a Y direction, and a vertical direction is defined as a Z direction.

The environment map 500 is created by using a technology such as the simultaneous localization and mapping (SLAM).

In the example illustrated in FIGS. 3A and 3B, the environment map 500 is configured as a voxel map in which a three-dimensional space is sectioned into voxel grids. Then, environment information indicating an occupancy state of an object is recorded in association with each voxel 510 of the environment map 500.

The occupancy state of an object is information indicating whether or not the voxel 510 is occupied by the object. For example, in a case where there is a measurement point 611 of point cloud data of the LiDAR 311 or 312 in the voxel 510, it is determined that the voxel is in an occupied state, and in a case where the measurement point 611 of point cloud data of the LiDAR 311 or 312 is not present in the voxel 510, it is determined that the voxel is in an unoccupied state.

As described above, the environment map 500 is configured as a set of voxels 510 in which environment information such as an occupancy state of an object is recorded in association with each voxel.

A target region in the space of the environment map 500 is set on the basis of a self-position of the mobile object 100 acquired using a technology such as SLAM or GPS. For example, the target region in the space of the environment map 500 is set at a region in a certain range centered at a self-position of the mobile object 100. Furthermore, the target region in the space of the environment map 500 may be limited by a time axis in such a manner that a region that holds environment information for a predetermined period should be set as the target region.

The size of the target region in the space of the environment map 500 is appropriately set according to the movement characteristics and use of the mobile object 100. For example, for the mobile object 100 moving at a high speed, a wide target region in the space of the environment map 500 is set. For the mobile object 100 moving at a low speed, a narrow target region is set.

The environment map 500 described above is updated whenever needed as the mobile object 100 moves. The frequency of updating the environment map 500 is, for example, about 10 to 100 times per second, and is appropriately set according to the use of the mobile object 100, or the like.

Then, the environment map 500 is updated on the basis of map base data 550. Here, the map base data 550 means data that has the same data structure as the environment map 500 and is used for updating the environment map 500.

Figure 4:
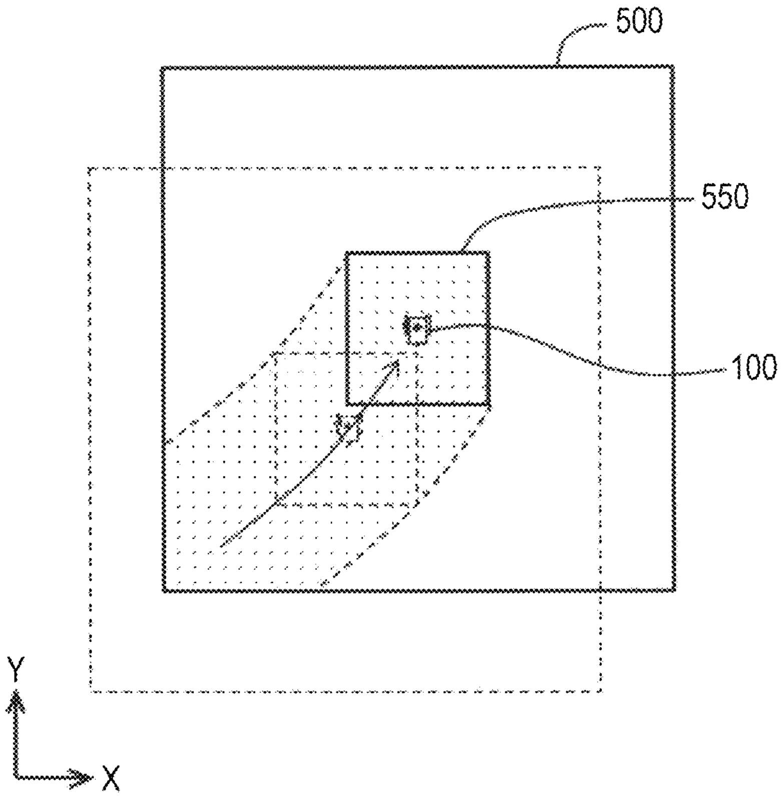
FIG. 4 is a view for explaining updating of an environment map.

FIG. 4 is a view for explaining updating of the environment map 500.

As illustrated in FIG. 4, the environment map 500 is updated using the map base data 550. Specifically, in the environment map 500, environment information in a target region in the map base data 550 is rewritten to environment information of the map base data 550. Furthermore, in the environment map 500, environment information in the other regions than the target region in the map base data 550 is maintained as it is.

The map base data 550 used for updating the environment map 500 has the same data structure as the environment map 500, but a target region in the space thereof is typically narrower than a target region in the environment map 500 as illustrated in FIG. 4. However, a target region in the map base data 550 may be wider than a target region in the environment map 500 depending on the use of the mobile object 100, for example, in a case where the mobile object 100 moves within an extremely narrow region, or the like.

An example in which the environment map 500 includes three-dimensional voxel grids has been described above.

However, the environment map 500 used in the information processing apparatus 200 of the present disclosure is not limited to one including three-dimensional voxel grids. The environment map 500 may include a modification of three-dimensional voxel grids or another map model such as a two-dimensional occupancy grid map.

(Information Processing Apparatus)

Figure 5:
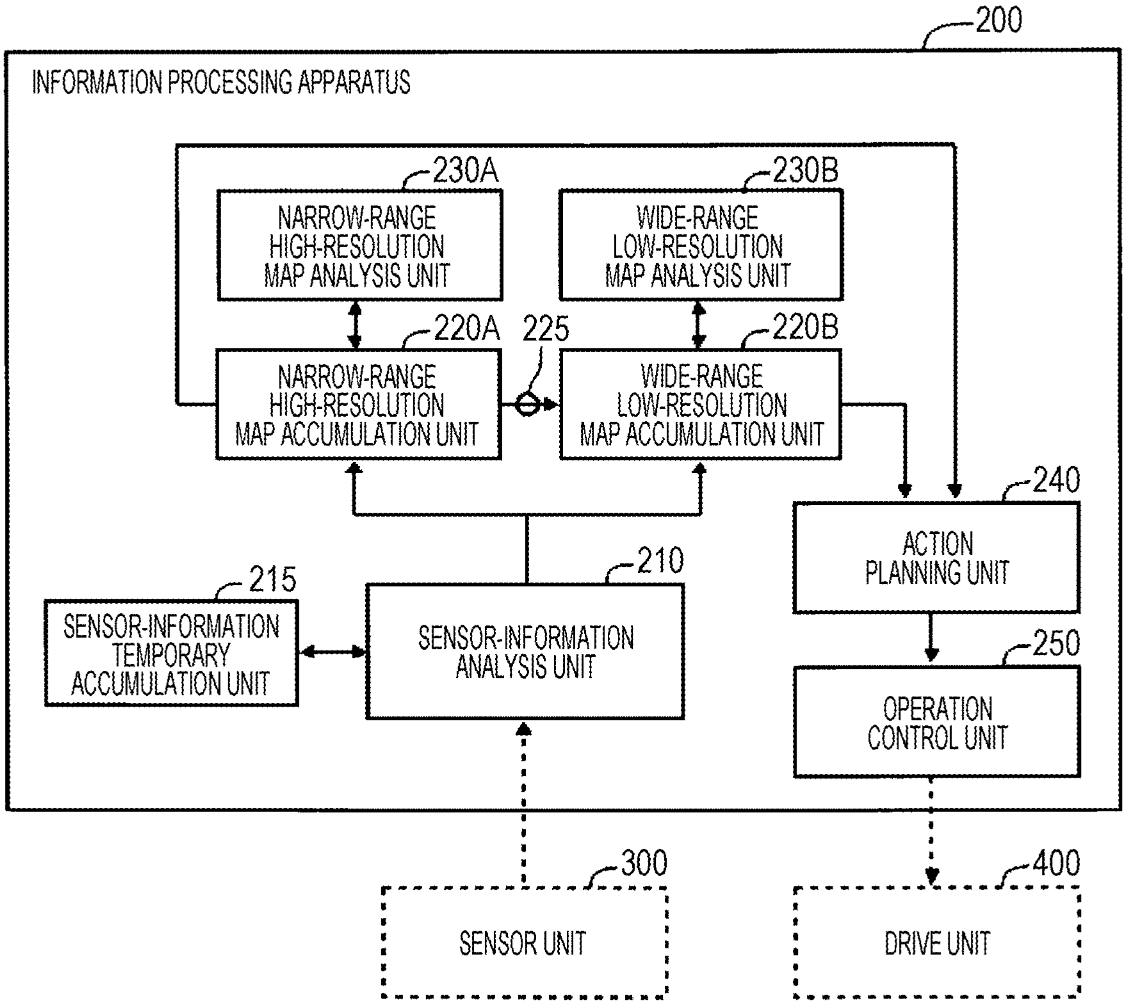
FIG. 5 is a block diagram illustrating an example of a configuration of the information processing apparatus according to the present embodiment.

FIG. 5 is a block diagram illustrating an example of a configuration of the information processing apparatus 200 according to the present embodiment.

The information processing apparatus 200 according to the present embodiment includes a sensor-information analysis unit 210, a sensor-information temporary accumulation unit 215, a narrow-range high-resolution map accumulation unit 220A, a narrow-range high-resolution map analysis unit 230A, a data conversion unit 225, a wide-range low-resolution map accumulation unit 220B, a wide-range low-resolution map analysis unit 230B, an action planning unit 240, and an operation control unit 250.

Before describing a configuration of each unit of the information processing apparatus 200, three features of the information processing apparatus 200 of the present embodiment will be described.

(First Feature—Analysis of Sensor Information)

As a first feature, the information processing apparatus 200 according to the present embodiment creates the map base data 550 using analysis result information as environment information, and updates the environment map 500 on the basis of the map base data 550.

Here, the analysis result information means information acquired by analysis of sensor information acquired in the sensor unit 300. For example, the analysis result information includes the inclination, flatness, reflection intensity, color, luminance, category, and the like of an object.

The inclination, flatness, and reflection intensity of an object are calculated from, for example, the point cloud data of the LiDAR 311 and 312. The color and luminance of an object are calculated from image data of the RGB camera 313, for example. A specific example of the analysis of sensor information will be described later.

The category of an object indicates the category of an object occupying the voxel 510, and indicates, for example, a floor, a wall, an obstacle, a roadway, a sidewalk, a sign, or the like. The category of an object is determined on the basis of analysis result information regarding another category. For example, the category of an object is determined from image data of the RGB camera 313 using an image recognition technology such as semantic segmentation. Furthermore, the category of an object may be determined on the basis of the inclination, flatness, reflection intensity, color, luminance, or the like of the object.

Figure 6:
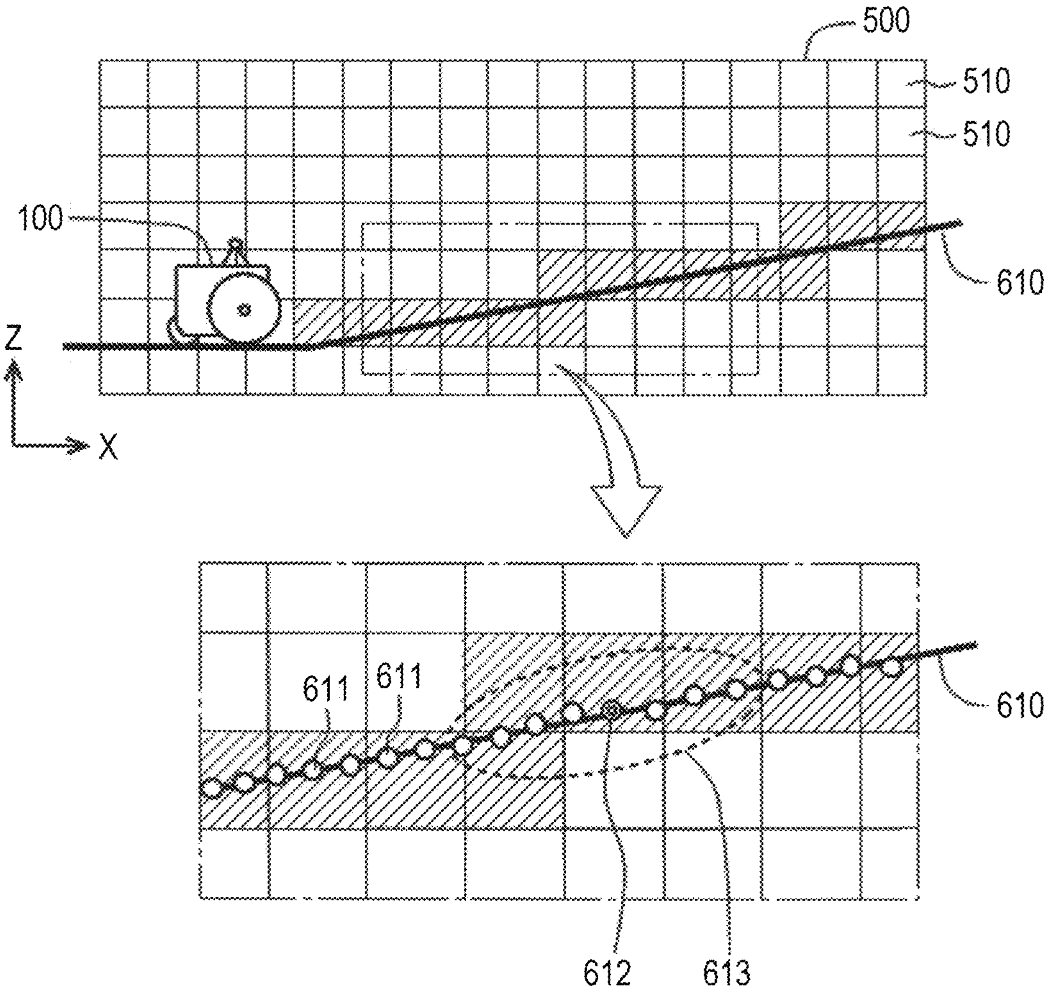
FIG. 6 is a view for explaining analysis of sensor information.

FIG. 6 is a view for explaining an example of the analysis of sensor information.

Here, the analysis of sensor information will be described by taking a situation in which the mobile object 100 is moving toward a slope 610, as an example.

Sensor information acquired when the region of the slope 610 is sensed by the LiDAR 311 is acquired as point cloud data that is a set of a large number of measurement points 611. However, information regarding an occupancy state of an object on the environment map 500 is quantized into the size of the voxel 510. Thus, the slope 610 that is flat in realty is expressed as a stepped slope on the environment map 500. As a result, despite an effort to control the mobile object 100 in accordance with the inclination of the slope 610, the inclination of the slope 610 is not correctly detected.

In this regard, one possible way to correctly detect the inclination of the slope 610 is to increase the resolution of the environment map 500. However, as the resolution of the environment map 500 increases, the processing burden and the memory usage of a computer that creates the environment map 500 and prepares action planning increase.

Then, the information processing apparatus 200 according to the present embodiment creates the map base data 550 in which environment information includes analysis result information regarding the inclination of an object, in addition to the occupancy state of the object, and performs a process of updating the environment map 500 on the basis of the thus created map base data 550. Particulars of the processes are as follows.

First, one of the measurement points 611 in the voxel 510 is picked up as an observed point 612.

Secondly, an evaluation window 613 that is a certain region including the observed point 612 is set. The evaluation window 613 is set, for example, on the basis of a distance from the observed point 612.

Subsequently, the measurement points 611 in the evaluation window 613 are sampled, and the inclination of the object is calculated on the basis of the sampled measurement points 611.

Then, the calculated inclination of the object is used as analysis result information for the voxel 510 from which the observed point 612 has been picked up.

Then, the above-described process is performed on each voxel 510.

Here, an example in which analysis result information regarding the inclination of an object is used has been described, but analysis result information to be used is not limited to information regarding the inclination of an object. For example, the information processing apparatus 200 may use analysis result information regarding the flatness, reflection intensity, hue, or luminance of an object.

For the analysis result information regarding the flatness and the reflection intensity of an object, for example, the point cloud data of the LiDAR 311 is analyzed, and the measurement points 611 in the evaluation window 613 are sampled. The analysis result information is calculated on the basis of the sampled measurement points 611. For the analysis result information regarding the reflection intensity, for example, the point cloud data of the LiDAR 311 is analyzed, and an average value of the reflection intensities of the measurement points 611 in the evaluation window 613 is calculated. For the analysis result information regarding the hue or the luminance of an object, for example, image data of the RGB camera 313 is analyzed, and an average value of pixels in the evaluation window 613 is calculated.

That is, the information processing apparatus 200 sets the evaluation window 613 that is a certain region including the observed point 612 that is one of the measurement points 611 in the voxel 510, and calculates analysis result information for the voxel 510 using the measurement points 611 in the evaluation window 613.

As described above, the information processing apparatus 200 does not use raw sensor information as environment information of the environment map 500, but uses analysis result information as environment information of the environment map 500, and hence the memory usage is reduced as compared with a case where raw sensor information is directly used as environment information. Furthermore, the analysis result information reflects all the sensor information in the evaluation window 613 that is set as a certain region including the observed point 612, and hence the information processing apparatus 200 can reduce the influence of quantization of environment information in the environment map 500.

The process of analyzing sensor information to acquire analysis result information is performed in the sensor-information analysis unit 210.

With the above-described first feature, in the information processing apparatus 200 of the present embodiment, detailed information can be recorded even with low resolution of the environment map 500, and as a result, the processing load or the memory usage can be reduced.

(Second Feature—Multi-Resolution Environment Map)

A second feature lies in that the information processing apparatus 200 of the present embodiment holds two environment maps 500 of a narrow-range high-resolution environment map 500A and a wide-range low-resolution environment map 500B.

Here, the terms, "narrow-range high-resolution" mean a narrower range and higher resolution than wide-range low-resolution. Conversely, the terms, "wide-range low-resolution" mean a wider range and lower resolution than narrow-range high-resolution.

Figure 7:
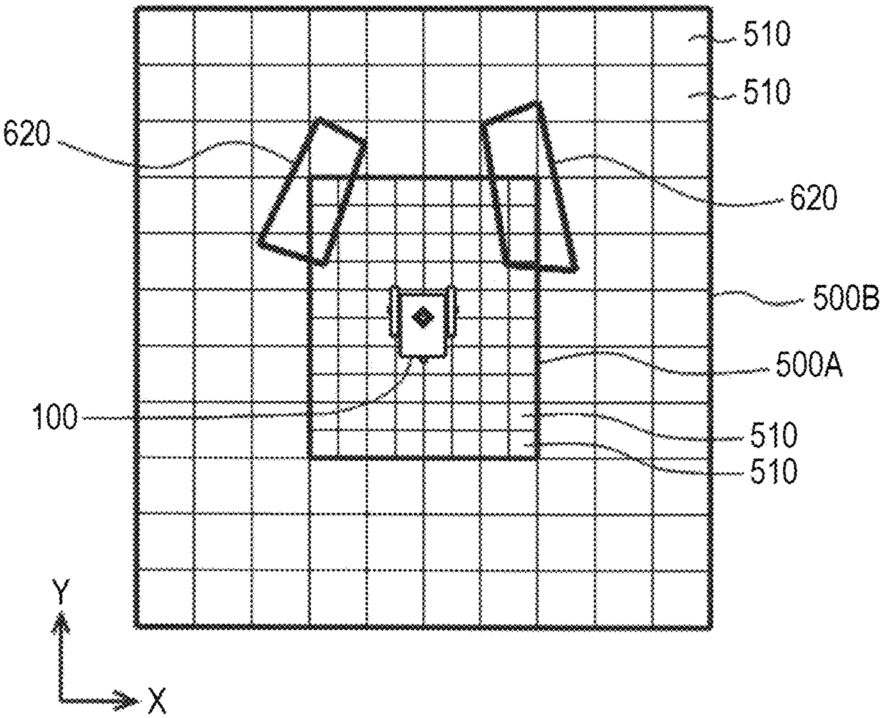
FIG. 7 is a view illustrating a narrow-range high-resolution environment map and a wide-range low-resolution environment map.

FIG. 7 is a view illustrating the narrow-range high-resolution environment map 500A and the wide-range low-resolution environment map 500B.

Figure 8A:
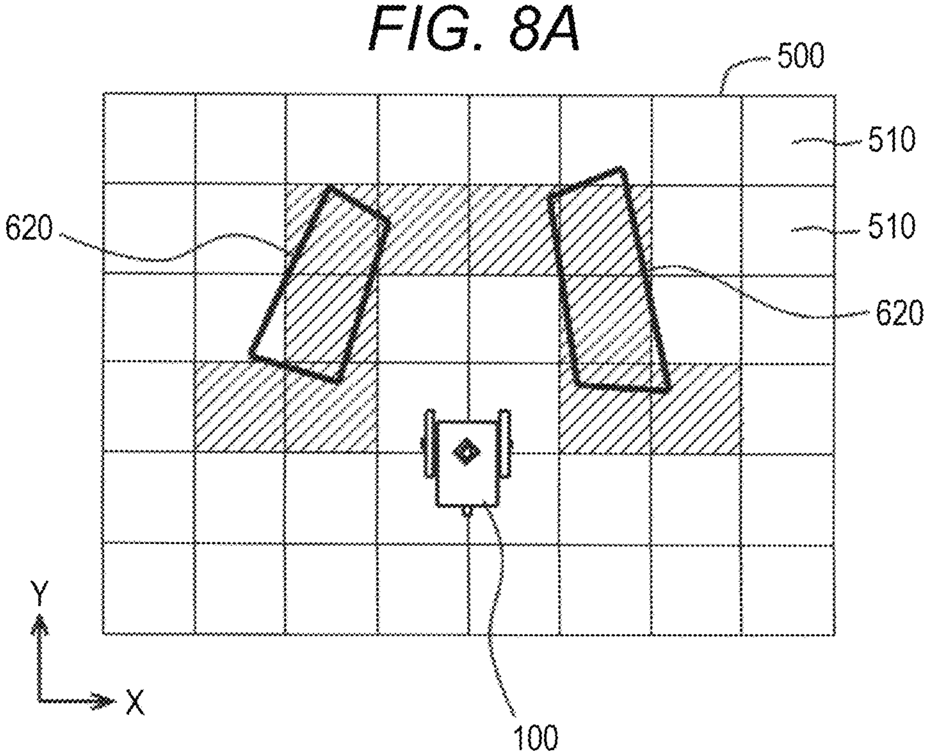
FIG. 8A is a view for explaining the influence of resolution of an environment map, and illustrates a case where the environment map has low resolution.

The reason why the information processing apparatus 200 holds the two environment maps 500 will be described with reference to FIGS. 8A and 8B.

For example, suppose that the environment map 500 is created in a case where the mobile object 100 moves in a narrow place sandwiched between two obstacles 620. At that time, the region occupied by the obstacles 620 may probably look larger by one voxel at the maximum because the environment map 500 is quantized into the voxels 510. Thus, in the environment map 500, the space between the two obstacles 620 is expressed as a narrow space.

Then, this tendency is pronounced in a case where the environment map 500 has low resolution. In the example illustrated in FIG. 8A, information about the occupancy states of the obstacles 620 is quantized into the voxels 510, so that there is no space between the two obstacles 620 in the environment map 500. Consequently, the mobile object 100 cannot travel between the two obstacles 620.

Figure 8B:
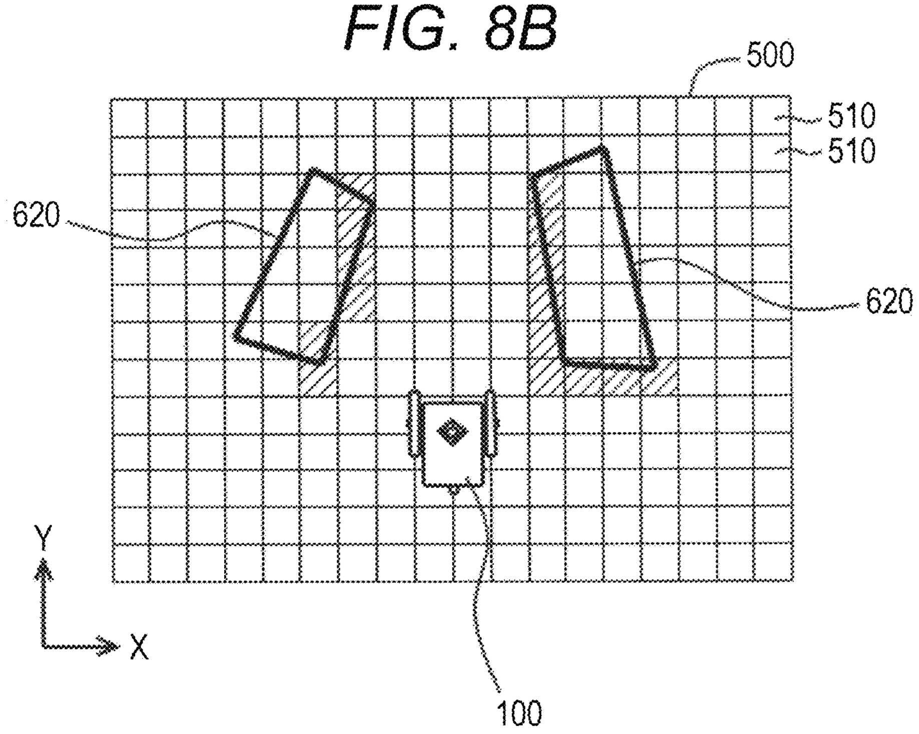
FIG. 8B is a view for explaining the influence of resolution of an environment map, and illustrates a case where the environment map has high resolution.

Meanwhile, with the environment map 500 having high resolution, the presence of a space between the two obstacles 620 is expressed on the environment map 500 as illustrated in FIG. 8B. As a result, the mobile object 100 can move in the narrow place sandwiched between the two obstacles 620. However, as the resolution of the environment map 500 increases, the processing burden and the memory usage of a computer that creates the environment map 500 and prepares action planning increase.

Then, in the information processing apparatus 200 of the present embodiment, in addition to the low-resolution environment map 500, the high-resolution environment map 500 in which a target region is narrower than that of the low-resolution environment map 500 is held. As described above, the information processing apparatus 200 narrows the target region of the high-resolution environment map 500 that involves a large processing load and large memory usage of the computer, to an appropriate extent, thereby reducing an increase in the processing load or the memory usage of the computer.

The processes of holding and updating the environment map 500 are performed in the sensor-information analysis unit 210, the narrow-range high-resolution map accumulation unit 220A, and the wide-range low-resolution map accumulation unit 220B.

Then, the information processing apparatus 200 can switch between the low-resolution environment map 500 and the high-resolution environment map 500 according to the situation, to use. Furthermore, the information processing apparatus 200 holds both the low-resolution environment map 500 and the high-resolution environment map 500, and can promptly switch between the low-resolution environment map 500 and the high-resolution environment map 500.

The processes of using and switching between the environment maps 500 are performed in the action planning unit 240.

With the above-described second feature, in the information processing apparatus 200 of the present embodiment, it is possible to reduce the processing burden or the memory usage, and promptly switch between the narrow-range high-resolution environment map 500A and the wide-range low-resolution environment map 500B.

(Third Feature—Analysis of Environment Map)

A third feature lies in that the information processing apparatus 200 of the present embodiment analyzes the environment map 500 to compensate for a missing part of environment information in the environment map 500.

Here, the missing part of environment information means a missing part of individual data forming the environment information. For example, the missing part of environment information is a part where data of the category of an object is missing in a partial region of space of the environment map 500. Furthermore, the missing part of environment information is not limited to blank data, and may be old data, i.e., data recorded before a predetermined time, for example.

Note that, for compensation for a missing part of environment information, it is not necessarily required to compensate for all of the missing part of environment information. For compensation for a missing part of environment information, it is only required to compensate for at least a part of the missing part of environment information. Furthermore, for compensation for a missing part of environment information, nothing may be compensated for when there is no estimatable missing part.

Here, compensation for a missing part of environment information will be described by taking compensation for a missing part of data of the category of an object, as an example.

Figure 9:
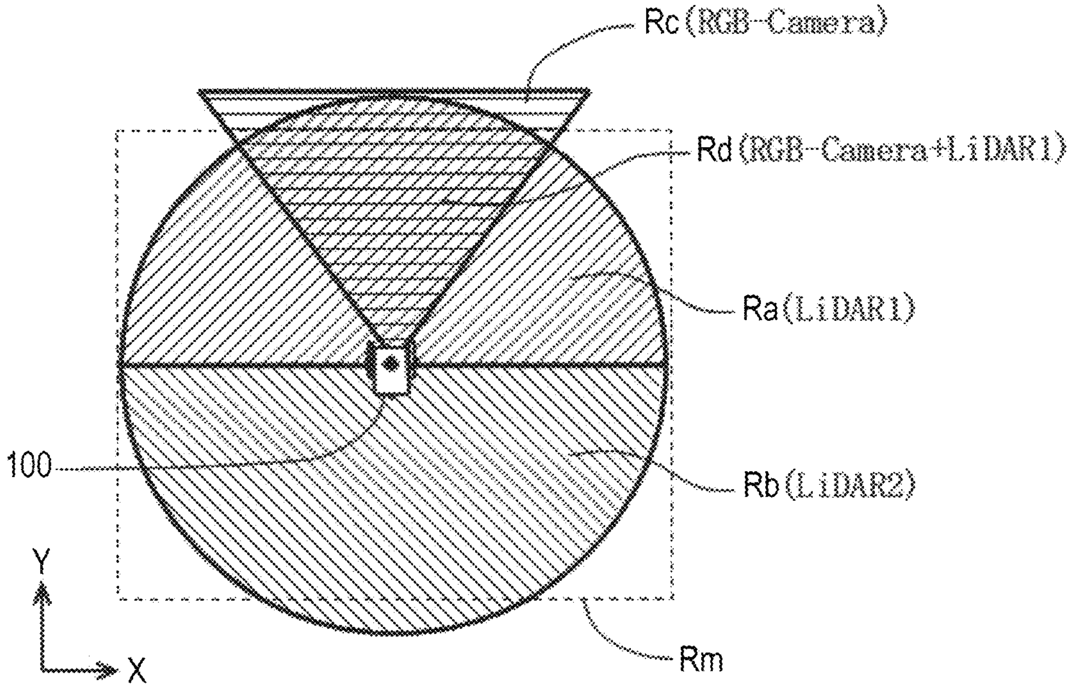
FIG. 9 is a view illustrating an example of a sensing area of a sensor.

FIG. 9 is a view illustrating an example of a sensing area of the sensor 310. FIG. 9 illustrates a sensing area Ra of the first LiDAR 311, a sensing area Rb of the second LiDAR 312, and a sensing area Rc of the RGB camera 313.

Figure 10:
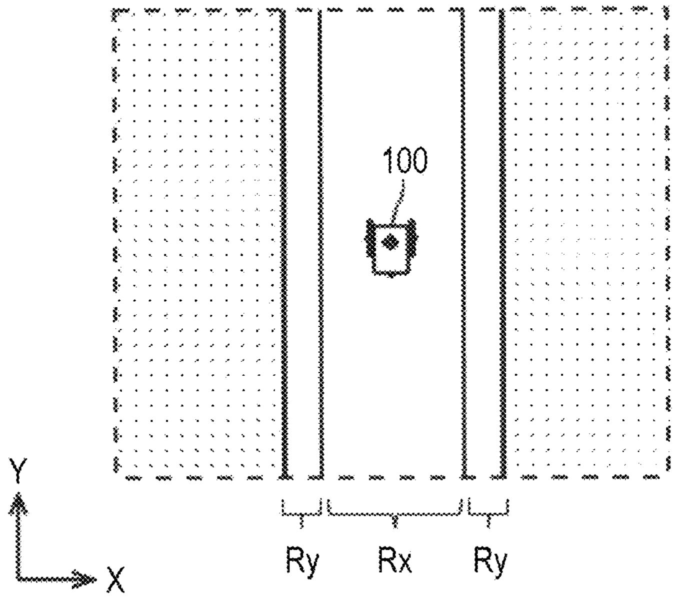
FIG. 10 is a view illustrating an example of a space to be sensed by the sensor.

FIG. 10 is a view illustrating an example of a space to be sensed by the sensor 310. The space illustrated in FIG. 10 is a space in which a floor surface configured as a horizontal plane is present. Furthermore, the floor surface has a roadway region Rx and a sidewalk region Ry. Then, the mobile object 100 is positioned in the roadway region Rx on the floor surface.

Figure 11A:
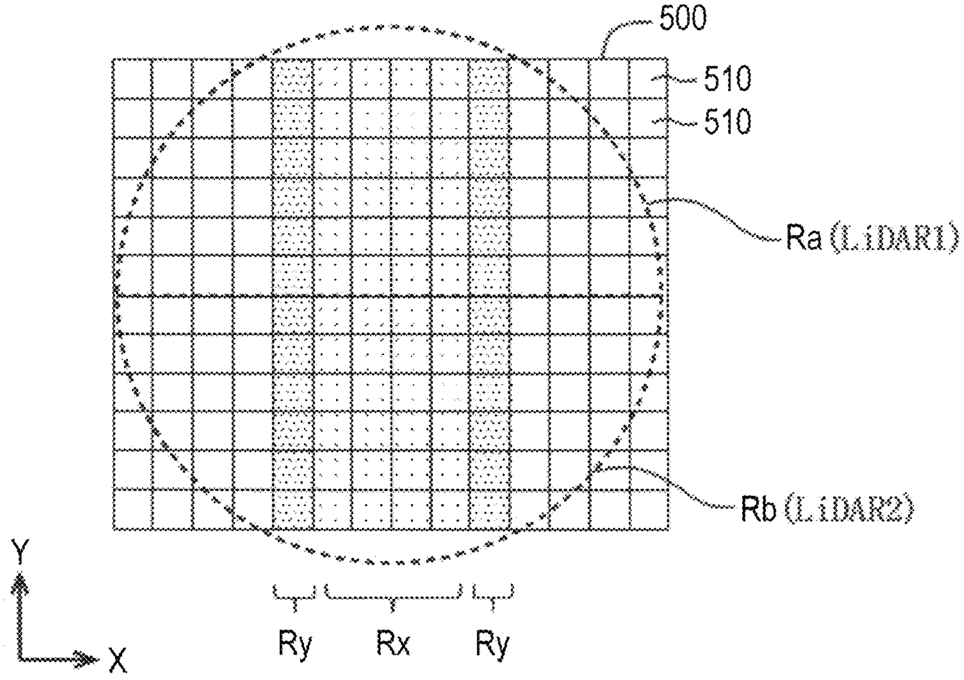
FIG. 11A is a view for explaining compensation for a missing part of environment information.
Figure 11B:
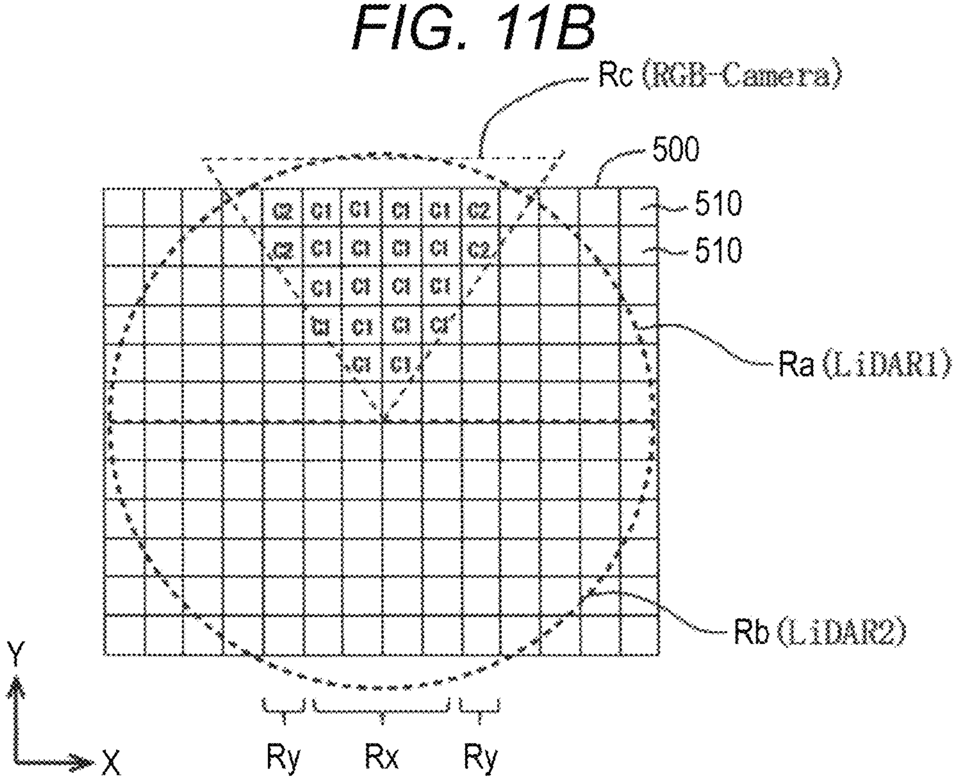
FIG. 11B is a view for explaining compensation for a missing part of environment information.
Figure 11C:
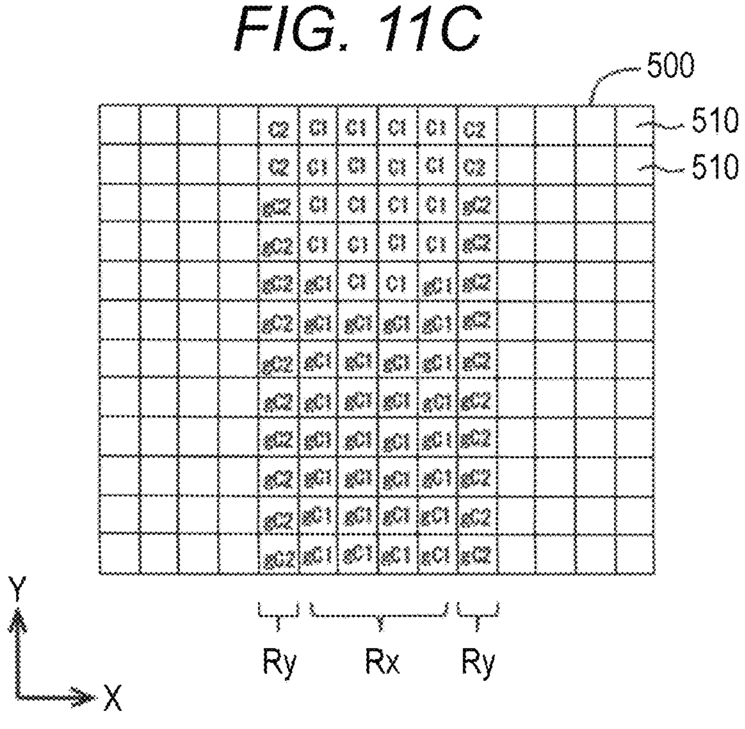
FIG. 11C is a view for explaining compensation for a missing part of environment information.

FIGS. 11A to 11C are views for explaining compensation for a missing part of environment information in the situation illustrated in FIGS. 9 and 10. In FIGS. 11A to 11C, the environment map 500 is illustrated as a set of voxels 510 arranged in a horizontal plane corresponding to the floor surface.

FIG. 11A illustrates a distribution of data of the reflection intensity or flatness of an object, acquired by analysis of the point cloud data of the LiDAR 311 and 312, on the environment map 500, in the situation illustrated in FIG. 10. Here, the object is the floor surface.

In the example illustrated in FIG. 11A, the reflection intensity or flatness of the object in each voxel 510 in the roadway region Rx has the substantially same value. Likewise, also the reflection intensity or flatness of the object in each voxel 510 in the sidewalk region Ry has the substantially same value.

FIG. 11B illustrates a distribution of data of the category of the object, acquired by analysis of the point cloud data of the LiDAR 311 and image data of the RGB camera 313, on the environment map 500, in the situation illustrated in FIG. 10.

In general, the category of an object is determined from image data of the RGB camera 313 using an image recognition technology. Then, by combination with the data of the occupancy state of the object acquired from the point cloud data of the LiDAR 311 and 312 or the like, it is determined what category of object is present and where the object is present.

Thus, in the region where the sensing area Ra of the LiDAR 311 and the sensing area Rc of the RGB camera 313 overlap in the environment map 500, the category of an object can be determined, and the data of the category of the object is recorded. In FIG. 11B, the data of the category of the object in the roadway region Rx is denoted by C1 meaning a roadway, and the data of the category of the object in the sidewalk region Ry is denoted by C2 meaning a sidewalk.

Meanwhile, in the sensing areas Ra and Rb of the LIDAR 311 and 312, no image data is present in a region where the sensing areas do not overlap the sensing area Rc of the RGB camera 313, so that the category of the object cannot be determined there. Thus, in that region, data of the category of the object is missing.

Consequently, in planning an action toward the outside of the sensing area Rc of RGB camera 313, such as turning or backward movement of the mobile object 100, action planning that allows entry into the sidewalk region Ry may probably be prepared because the roadway region Rx and the sidewalk region Ry cannot be distinguished from each other.

Note that, in a case where the mobile object 100 is traveling in one direction as in the situation illustrated in FIG. 4, there remains the data of the category of the object having been recorded during the presence of the mobile object 100 behind the current location, and thus, the data of the category of the object is present also in the region behind the mobile object 100 in the environment map 500. Hence, the problem of missing of data of the category of the object occurs particularly when the mobile object 100 starts to move or curves.

One possible way to overcome this problem is to eliminate a blind spot of the sensing area Rc of the RGB camera 313 by arranging the plurality of RGB cameras 313 in the mobile object 100. However, an increase of the number of RGB cameras 313 causes an increase of the processing load, the memory usage, and costs.

Then, the information processing apparatus 200 of the present embodiment estimates the content of a missing part of environment information in the environment map 500 by analyzing the environment map 500, and performs a process of providing the estimated content as compensation for the missing part of the environment information.

More specifically, the information processing apparatus 200 of the present embodiment estimates the content of a missing part of a predetermined kind of environment information by evaluating the continuity of another environment information, and performs a process of providing the estimated content as compensation for the missing part of the environment information.

Furthermore, the information processing apparatus 200 of the present embodiment performs a process of compensating for a missing part of environment information in a format in which environment information compensated for by analysis of the environment map 500 can be identified.

FIG. 11C is a view for explaining a process of estimating a missing part of data of the category of an object from the data of the environment map 500 illustrated in FIGS. 11A and 11B, and compensating for the missing part.

The missing part of the data of the category of the object is estimated by evaluation of the continuity with the region where the data of the category of the object is recorded, with respect to the region where the data of the category of the object is missing.

For example, in a region continuous with a region recorded as the roadway C1, a region having the same reflection intensity or the same flatness of the object as that of the region recorded as the roadway C1 can be estimated as a roadway. Likewise, in a region continuous with a region recorded as the sidewalk C2, a region having the same reflection intensity or the same flatness of the object as that of the region recorded as the sidewalk C2 can be estimated as a sidewalk.

Then, the data acquired by the estimation is recorded in the environment map 500 in a format in which the data acquired by the estimation can be identified so as to be clearly distinguished from analysis result information acquired by analysis of sensor information. Regarding this format, for example, it is conceivable to record identification information indicating whether or not the data is acquired by the estimation, in association with the data of the corresponding environment information.

In the example illustrated in FIG. 11C, the data of the category of the object in the region estimated as a roadway is denoted by gC1 distinguished from C1, and the data of the category of the object in the region estimated as a sidewalk is denoted by gC2 distinguished from C2.

In this manner, the information processing apparatus 200 performs a process of compensating for a missing part of environment information in a format in which environment information compensated for by analysis of the environment map 500 can be identified. Consequently, the information processing apparatus 200 can link the identification information to action planning of the mobile object 100.

For example, in action planning in which the mobile object 100 moves toward a region where environment information compensated for by analysis of the environment map 500 is present, one possible way to prepare more accurate action planning is to direct the RGB camera 313 toward the region while slowing down and acquire data of the category of the object from image data of the RGB camera 313.

Hereinabove, description has been given by taking a case where the content of a missing part of data of the category of an object is estimated by evaluation of the continuity of data of the reflection intensity or the flatness of the object, and the estimated content is provided as compensation for the data of the category of the object, as an example. However, the environment information to be compensated for is not limited to the category of an object. Furthermore, the environment information used for evaluating continuity is not limited to the reflection intensity or flatness of an object.

The time at which the process of analyzing the environment map 500 is performed is not limited to any particular time. For example, the process of analyzing the environment map 500 may be performed every time the environment map 500 is updated. Alternatively, the process of analyzing the environment map 500 may be performed at regular time intervals. Alternatively, the process of analyzing the environment map 500 may be performed in a case where it is supposed that many missing parts of environment information are caused, such as a time when the mobile object 100 starts or curves.

Furthermore, depending on action planning, the process of analyzing the environment map 500 may be performed at a relatively high frequency on a region where the mobile object 100 is very likely to enter in the future, and may be performed at a relatively low frequency on a region where the mobile object 100 is less likely to invade. In this case, it is possible to reduce the processing load and the memory usage of the computer.

Furthermore, the information processing apparatus 200 of the present embodiment can analyze the environment map 500, to correct an abnormal value of environment information in the environment map 500. Thus, a defect can be prevented from being caused due to an abnormal value of the environment map 500.

The process of analyzing the environment map 500 is performed in the narrow-range high-resolution map analysis unit 230A and the wide-range low-resolution map analysis unit 230B.

With the third feature, in the information processing apparatus 200 of the present embodiment, the number of the sensors 310 arranged in the mobile object 100 can be reduced, and hence the processing load or the memory usage can be reduced. Furthermore, in the information processing apparatus 200 of the present embodiment, the number of the sensors 310 arranged in the mobile object 100 can be reduced, and hence costs can be reduced.

As described above, the information processing apparatus 200 of the present embodiment compensates for a missing part of environment information in the environment map 500, but the information processing apparatus 200 of the present disclosure is not limited thereto. The information processing apparatus 200 of the present disclosure is only required to analyze the environment map 500 to compensate for or correct environment information in the environment map 500. With this configuration, the environment map 500 can be made suitable for preparing action planning.

Next, configurations of the respective units of the information processing apparatus will be described.

(Sensor-Information Analysis Unit)

The sensor-information analysis unit 210 analyzes sensor information acquired by the sensor unit 300, and creates narrow-range high-resolution map base data 550A and wide-range low-resolution map base data 550B.

As described later, the wide-range low-resolution environment map 500B is updated by using environment information in the narrow-range high-resolution environment map 500A. Hence, the wide-range low-resolution map base data 550B does not include data in a region of space that overlaps a region of space of the narrow-range high-resolution map base data 550A. With this configuration, the processing load or the memory usage in the information processing apparatus 200 can be reduced. Note that the wide-range low-resolution map base data 550B is only required to omit at least a part of data in a region that overlaps the narrow-range high-resolution map base data 550A.

Furthermore, the sensor-information analysis unit 210 transmits the narrow-range high-resolution map base data 550A to the narrow-range high-resolution map accumulation unit 220A, and transmits the wide-range low-resolution map base data 550B to the wide-range low-resolution map accumulation unit 220B.

(Sensor-Information Temporary Accumulation Unit)

The sensor-information temporary accumulation unit 215 is connected to the sensor-information analysis unit 210, and temporarily accumulates therein sensor information transmitted from the sensor unit 300 in order to allow the sensor-information analysis unit 210 described above to analyze the sensor information. With the sensor-information temporary accumulation unit 215, for example, in a case where the density of sensor information is not sufficient, a small amount of data in the past time can be combined for use, which enables analysis with information at a sufficient density. Furthermore, because of the inclusion of the sensor-information temporary accumulation unit 215, for example, the sensor-information analysis unit 210 can perform a process of removing noises in a time-axis direction in sensor information. However, the information processing apparatus 200 is not necessarily required to include the sensor-information temporary accumulation unit 215.

(Narrow-Range High-Resolution Map Accumulation Unit)

The narrow-range high-resolution map accumulation unit 220A accumulates therein the narrow-range high-resolution environment map 500A.

More specifically, the narrow-range high-resolution map accumulation unit 220A holds the narrow-range high-resolution environment map 500A, and updates the narrow-range high-resolution environment map 500A using the narrow-range high-resolution map base data 550A created by the sensor-information analysis unit 210.

As described above, a target region in the space of the environment map 500 is set on the basis of a self-position of the mobile object 100 acquired using a technology such as SLAM or GPS.

(Narrow-Range High-Resolution Map Analysis Unit)

The narrow-range high-resolution map analysis unit 230A analyzes the narrow-range high-resolution environment map 500A held in the narrow-range high-resolution map accumulation unit 220A, and compensates for a missing part of environment information in the narrow-range high-resolution environment map 500A.

More specifically, the narrow-range high-resolution map analysis unit 230A analyzes the narrow-range high-resolution environment map 500A, to estimate the content of a missing part of environment information in the narrow-range high-resolution environment map 500A, and provides the estimated content as compensation for the missing part of the environment information.

Still more specifically, the narrow-range high-resolution map analysis unit 230A estimates the content of a missing part of a predetermined kind of environment information by evaluating the continuity of another environment information, and provides the estimated content as compensation for the missing part of the environment information.

Then, the narrow-range high-resolution map analysis unit 230A compensates for the missing part of the environment information in a format in which it can be identified as environment information compensated for by analysis of the environment map 500.

Furthermore, the narrow-range high-resolution map analysis unit 230A may analyze the narrow-range high-resolution environment map 500A held in the narrow-range high-resolution map accumulation unit 220A, and correct an abnormal value of environment information in the narrow-range high-resolution environment map 500A.

Meanwhile, the narrow-range high-resolution map analysis unit 230A of the present embodiment compensates for a missing part of environment information in the narrow-range high-resolution environment map 500A, but the narrow-range high-resolution map analysis unit of the present disclosure is not limited thereto. The narrow-range high-resolution map analysis unit of the present disclosure is only required to analyze the narrow-range high-resolution environment map 500A held in the narrow-range high-resolution map accumulation unit 220A, and compensate for or correct environment information in the narrow-range high-resolution environment map 500A.

(Data Conversion Unit)

The data conversion unit 225 is provided between the narrow-range high-resolution map accumulation unit 220A and the wide-range low-resolution map accumulation unit 220B, and converts data of environment information in the narrow-range high-resolution environment map 500A into data of environment information in the wide-range low-resolution environment map 500B.

In data conversion in the data conversion unit 225, typically, the plurality of voxels 510 in the narrow-range high-resolution environment map 500A corresponds to one voxel 510 in the wide-range low-resolution environment map 500B. Then, the data conversion in the data conversion unit 225 can be performed by, for example, a method of taking a median value of data of the plurality of voxels 510 in the narrow-range high-resolution environment map 500A, taking an average of the data, taking a maximum value of the data, taking a minimum value of the data, or the like.

Furthermore, the data conversion in the data conversion unit 225 may be performed by weighting and averaging of the data of the plurality of voxels 510 in the narrow-range high-resolution environment map 500A such that the data of one of the plurality of voxels 510 closer to the center of gravity of the voxel 510 of the wide-range low-resolution environment map 500B is more strongly reflected. The spatial coordinates indicated by the one voxel 510 can be considered to be at the center of gravity thereof. Then, by assigning a heavier weight to a voxel closer to the center of gravity of the one voxel 510, it is possible to allow high-resolution information in the region closer to the center of gravity to be more strongly reflected. As a result, the data converted by the data conversion unit 225 is close to the observed reality.

(Wide-Range Low-Resolution Map Accumulation Unit)

The wide-range low-resolution map accumulation unit 220B accumulates therein the wide-range low-resolution environment map 500B.

More specifically, the wide-range low-resolution map accumulation unit 220B holds the wide-range low-resolution environment map 500B, and updates the wide-range low-resolution environment map 500B using environment information in the narrow-range high-resolution environment map 500A and the wide-range low-resolution map base data 550B created by the sensor-information analysis unit 210.

When updating the wide-range low-resolution environment map 500B, the wide-range low-resolution map accumulation unit 220B uses environment information in the narrow-range high-resolution environment map 500A, in addition to the wide-range low-resolution map base data 550B. That is, in updating of the wide-range low-resolution environment map 500B, a region of space overlapping the narrow-range high-resolution environment map 500A is updated by using environment information in the narrow-range high-resolution environment map 500A, and the other regions of space are updated by using the wide-range low-resolution map base data 550B created by the sensor-information analysis unit 210. With this configuration, the processing load or the memory usage in the information processing apparatus 200 can be reduced.

(Wide-Range Low-Resolution Map Analysis Unit)

The wide-range low-resolution map analysis unit 230B analyzes the wide-range low-resolution environment map 500B held in the wide-range low-resolution map accumulation unit 220B, and compensates for a missing part of environment information in the wide-range low-resolution environment map 500B. The configuration of the wide-range low-resolution map analysis unit 230B is similar to that of the narrow-range high-resolution map analysis unit 230A.

(Action Planning Unit)

The action planning unit 240 prepares action planning on the basis of the narrow-range high-resolution environment map 500A held in the narrow-range high-resolution map accumulation unit 220A or the wide-range low-resolution environment map 500B held in the wide-range low-resolution map accumulation unit 220B, and transmits the action planning to the operation control unit 250.

In preparing action planning, the action planning unit 240 selects either the narrow-range high-resolution environment map 500A or the wide-range low-resolution environment map 500B according to the situation.

More specifically, the action planning unit 240 first prepares action planning on the basis of the wide-range low-resolution environment map 500B. Then, when it is determined that more accurate action planning is necessary, the action planning unit 240 prepares action planning on the basis of the narrow-range high-resolution environment map 500A.

With regard to the necessity of highly accurate action planning, it can be considered that it is determined that highly accurate action planning is necessary in a case where there is an impassable place on the wide-range low-resolution environment map 500B, in a case where a vehicle is getting close to a stop position, in a case where an obstacle or a moving object is present near a vehicle, or the like, for example.

With this configuration, the information processing apparatus 200 can prepare appropriate action planning while reducing the processing load or the memory usage.

Note that the action planning unit 240 is not an essential component for the information processing apparatus 200, and may be provided in an apparatus outside the information processing apparatus 200.

(Operation Control Unit)

The operation control unit 250 controls the drive unit 400 on the basis of action planning prepared in the action planning unit 240. Then, the drive unit 400 moves the mobile object 100 under the control of the operation control unit 250.

Note that the operation control unit 250 is not an essential component for the information processing apparatus 200, and may be provided in an apparatus outside the information processing apparatus 200.

2. Example of Operations of Information Processing Apparatus

Next, an example of operations of the information processing apparatus 200 will be described.

FIGS. 12A to 12D are flowcharts illustrating an example of operations of the information processing apparatus 200 according to the present embodiment.

Figure 12A:
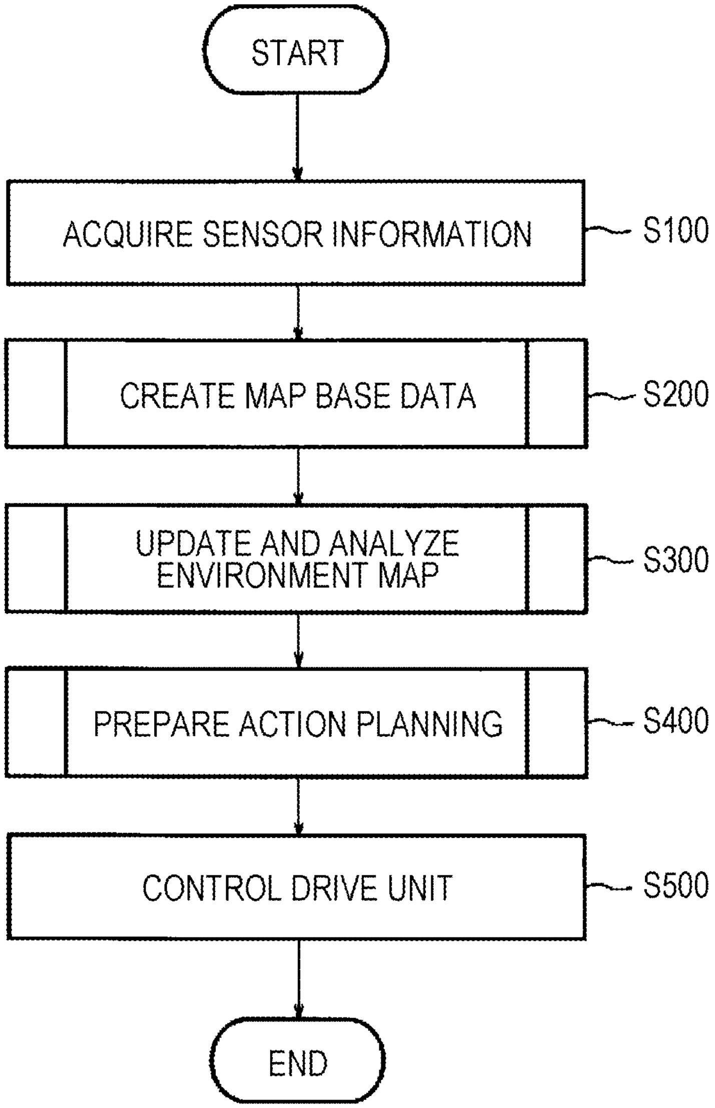
FIG. 12A is a flowchart illustrating an example of operations of the information processing apparatus according to the present embodiment.
Figure 12B:
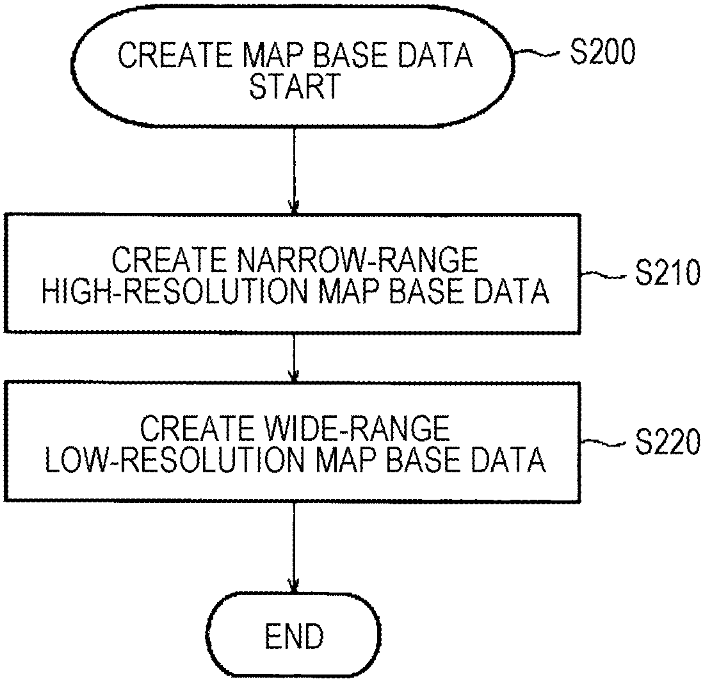
FIG. 12B is a flowchart illustrating an example of operations of the information processing apparatus according to the present embodiment.
Figure 12C:
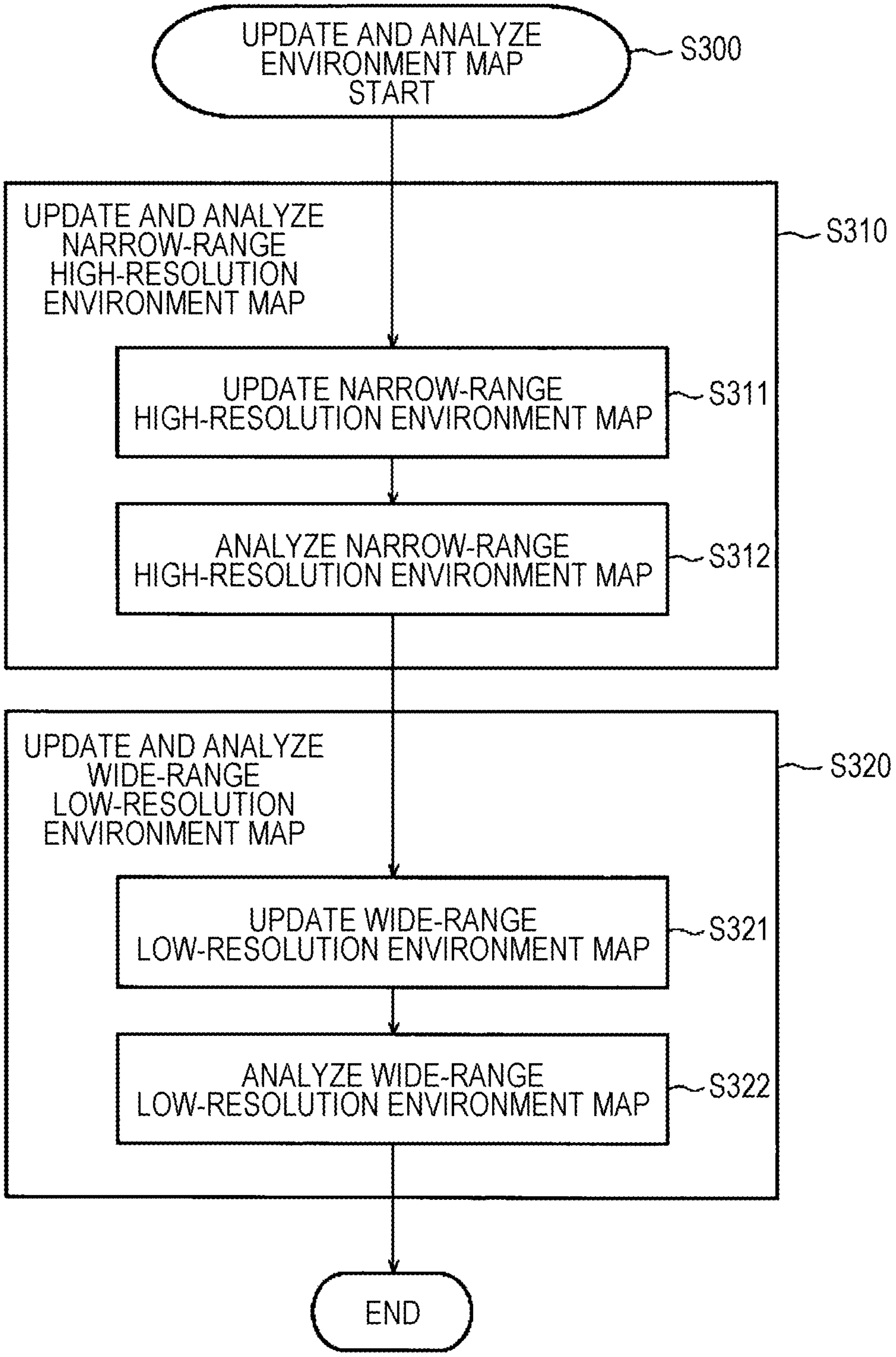
FIG. 12C is a flowchart illustrating an example of operations of the information processing apparatus according to the present embodiment.
Figure 12D:
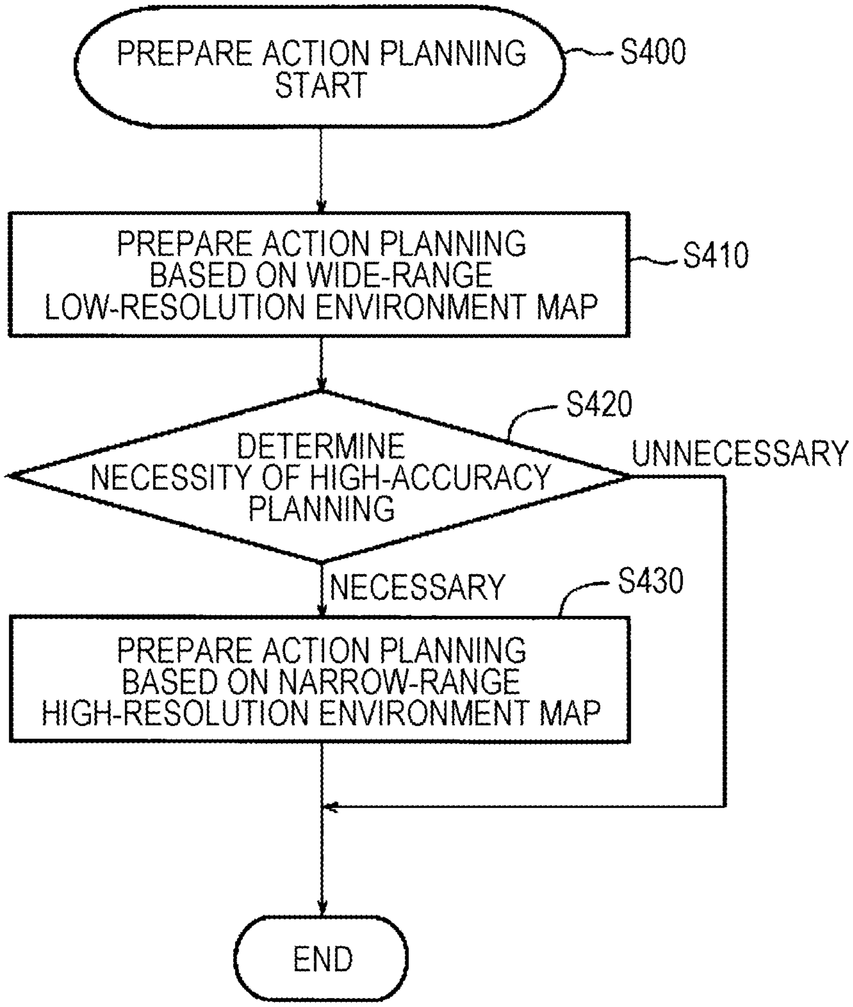
FIG. 12D is a flowchart illustrating an example of operations of the information processing apparatus according to the present embodiment.

As illustrated in FIG. 12A, the information processing apparatus 200 according to the present embodiment sequentially performs steps of (1) step S100 of acquiring sensor information, (2) step S200 of creating map base data, (3) step S300 of updating and analyzing an environment map, (4) step S400 of preparing action planning, and (5) step S500 of controlling a drive unit.

(Step of Acquiring Sensor Information)

In step S100 of acquiring sensor information described above as (1), the sensor-information analysis unit 210 acquires sensor information transmitted from the sensor unit 300.

(Step of Creating Map Base Data)

Step S200 of creating map base data described above as (2) includes, as illustrated in FIG. 12B, (2-1) step S210 of creating narrow-range high-resolution map base data, and (2-2) step S220 of creating wide-range low-resolution map base data.

In step S210 of creating narrow-range high-resolution map base data described above as (2-1), the sensor-information analysis unit 210 analyzes sensor information, and creates the narrow-range high-resolution map base data 550A.

In step S220 of creating wide-range low-resolution map base data described above as (2-2), the sensor-information analysis unit 210 analyzes sensor information, and creates the wide-range low-resolution map base data 550B.

(Step of Updating and Analyzing Environment Map)

Step S300 of updating and analyzing an environment map described above as (3) includes, as illustrated in FIG. 12C, (3-1) step S310 of updating and analyzing a narrow-range high-resolution environment map, and (3-2) step S320 of updating and analyzing a wide-range low-resolution environment map.

Step S310 of updating and analyzing narrow-range high-resolution environment map described above as (3-1) includes step S311 of updating the narrow-range high-resolution environment map 500A and step S312 of analyzing the narrow-range high-resolution environment map 500A.

In step S311 of updating a narrow-range high-resolution environment map, the narrow-range high-resolution map accumulation unit 220A updates the narrow-range high-resolution environment map 500A on the basis of the narrow-range high-resolution map base data 550A created by the sensor-information analysis unit 210.

In step S312 of analyzing a narrow-range high-resolution environment map, the narrow-range high-resolution map analysis unit 230A analyzes the narrow-range high-resolution environment map 500A, and compensates for a missing part of environment information in the narrow-range high-resolution environment map 500A.

Step S320 of updating and analyzing a wide-range low-resolution environment map described above as (3-2) includes step S321 of updating a wide-range low-resolution environment map and step S322 of analyzing a wide-range low-resolution environment map.

In step S321 of updating a wide-range low-resolution environment map, the wide-range low-resolution map accumulation unit 220B updates the wide-range low-resolution environment map 500B on the basis of data of the narrow-range high-resolution environment map 500A and the wide-range low-resolution map base data 550B created by the sensor-information analysis unit 210.

In step S322 of analyzing a wide-range low-resolution environment map, the wide-range low-resolution map analysis unit 230B analyzes the wide-range low-resolution environment map 500B, and compensates for a missing part of environment information in the wide-range low-resolution environment map 500B.

(Step of Preparing Action Planning)

Step S400 of preparing action planning described above as (4), as illustrated in FIG. 12D, includes (4-1) step 410 of preparing action planning on the basis of a wide-range low-resolution environment map, (4-2) step S420 of determining the necessity of highly-accurate planning, and (4-3) step S430 of preparing action planning on the basis of a narrow-range high-resolution environment map.

In the step 410 of preparing action planning on the basis of a wide-range low-resolution environment map described above as (4-1), the action planning unit 240 prepares action planning on the basis of the wide-range low-resolution environment map 500B held in the wide-range low-resolution map accumulation unit 220B.

In step S420 of determining the necessity of highly-accurate planning described above as (4-2), the action planning unit 240 determines the necessity of more accurate action planning. In step S420 of determining the necessity of more accurate planning, in a case where the necessity of more accurate planning is recognized, the process proceeds to step S430 of preparing action planning on the basis of a narrow-range high-resolution environment map described above as (4-3). In a case where the necessity of more accurate planning is not recognized, step S400 of preparing action planning described above as (4) ends.

In step S430 of preparing action planning on the basis of a narrow-range high-resolution environment map described above as (4-3), the action planning unit 240 prepares action planning on the basis of the narrow-range high-resolution environment map 500A held in the narrow-range high-resolution map accumulation unit 220A.

(Step of Controlling Driving Unit)

In step S500 of controlling a drive unit described above as (5), the operation control unit 250 controls the drive unit 400 on the basis of action planning prepared in the action planning unit 240.

To sum up the above description, the information processing apparatus 200 according to the present embodiment includes the sensor-information analysis unit 210, the narrow-range high-resolution map accumulation unit 220A (first map accumulation unit), the narrow-range high-resolution map analysis unit 230A (first map analysis unit), the wide-range low-resolution map accumulation unit 220B (second map accumulation unit), and the wide-range low-resolution map analysis unit 230B (second map analysis unit).

Furthermore, an information processing method performed by the information processing apparatus 200 according to the present embodiment includes step S100 of acquiring sensor information, the step S200 of creating map base data, step S310 of updating and analyzing a narrow-range high-resolution environment map, and step S320 of updating and analyzing a wide-range low-resolution environment map.

Therefore, with the information processing apparatus 200 and the information processing method of the present embodiment, it is possible to reduce the processing burden or the memory usage, and promptly switch between the narrow-range high-resolution environment map 500A and the wide-range low-resolution environment map 500B.

3. Modifications

Next, the information processing apparatus 200 according to modifications will be described.

First Modification

Figure 13:
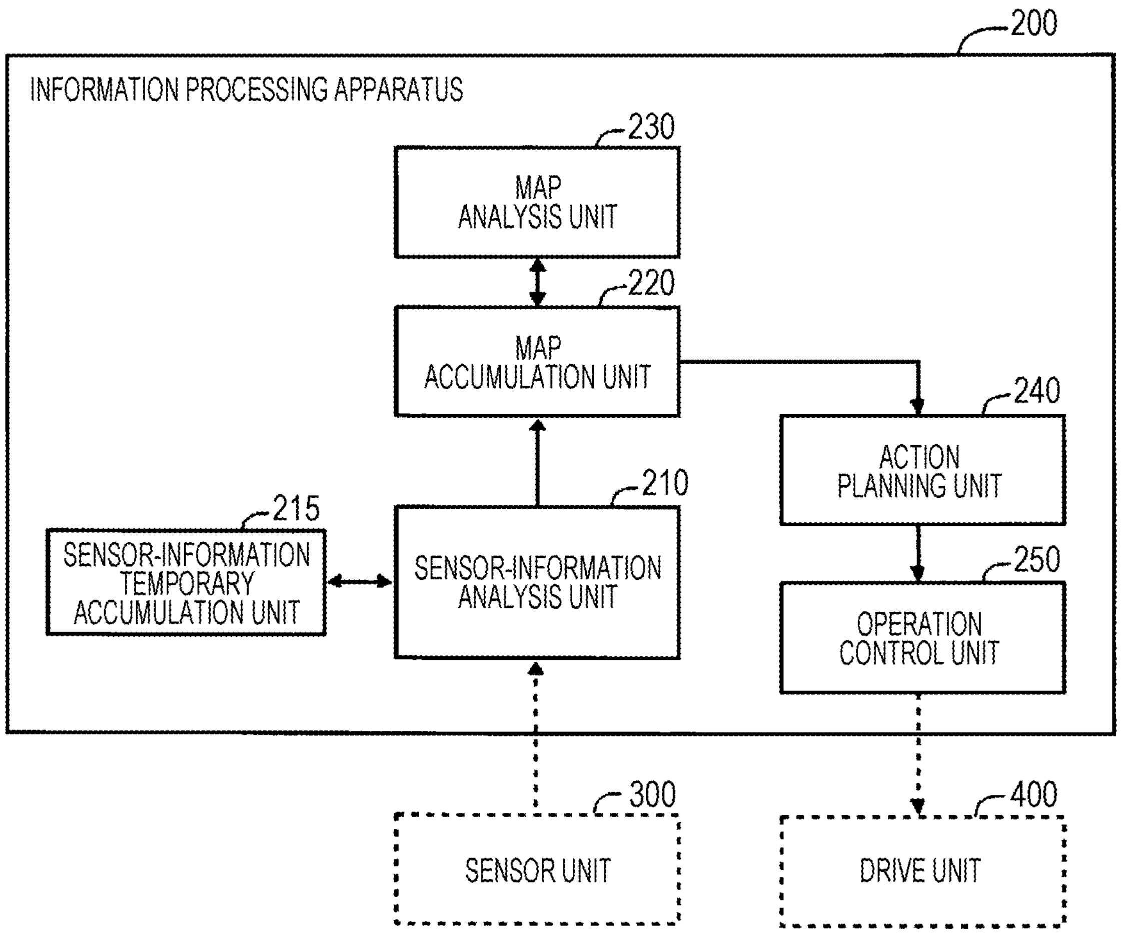
FIG. 13 is a block diagram illustrating an example of a configuration of an information processing apparatus according to a first modification.

FIG. 13 is a block diagram illustrating an example of a configuration of the information processing apparatus 200 according to a first modification.

The information processing apparatus 200 of the first modification is different from the information processing apparatus 200 of the present embodiment in using only one environment map 500.

The information processing apparatus 200 of the first modification includes the sensor-information analysis unit 210, the sensor-information temporary accumulation unit 215, the map accumulation unit 220, the map analysis unit 230, the action planning unit 240, and the operation control unit 250.

The sensor-information analysis unit 210 of the first modification analyzes sensor information acquired by the sensor unit 300 to create the map base data 550. The map accumulation unit 220 of the first modification updates the environment map 500 on the basis of the map base data 550. The map analysis unit 230 of the first modification analyzes the environment map 500 held in the map accumulation unit 220, and compensates for a missing part of environment information in the environment map 500. The action planning unit 240 of the first modification prepares action planning on the basis of the environment map 500 held in the map accumulation unit 220, and transmits the action planning to the operation control unit 250.

The other components of the information processing apparatus 200 of the first modification are similar to the above-described components of the information processing apparatus 200 of the present embodiment. Furthermore, the operations of the information processing apparatus 200 of the first modification are similar to the above-described operations of the information processing apparatus 200 of the present embodiment except for use of only one environment map 500.

As described above, the information processing apparatus 200 of the first modification includes the sensor-information analysis unit 210, the map accumulation unit 220, and the map analysis unit 230.

Furthermore, an information processing method performed by the information processing apparatus 200 according to the first modification includes step S100 of acquiring sensor information, step S200 of creating map base data, step S311 of updating an environment map, and step S312 of analyzing the environment map.

With the information processing apparatus 200 and the information processing method of the first modification described above, the processing burden or the memory usage can be reduced.

Second Modification

Figure 14:
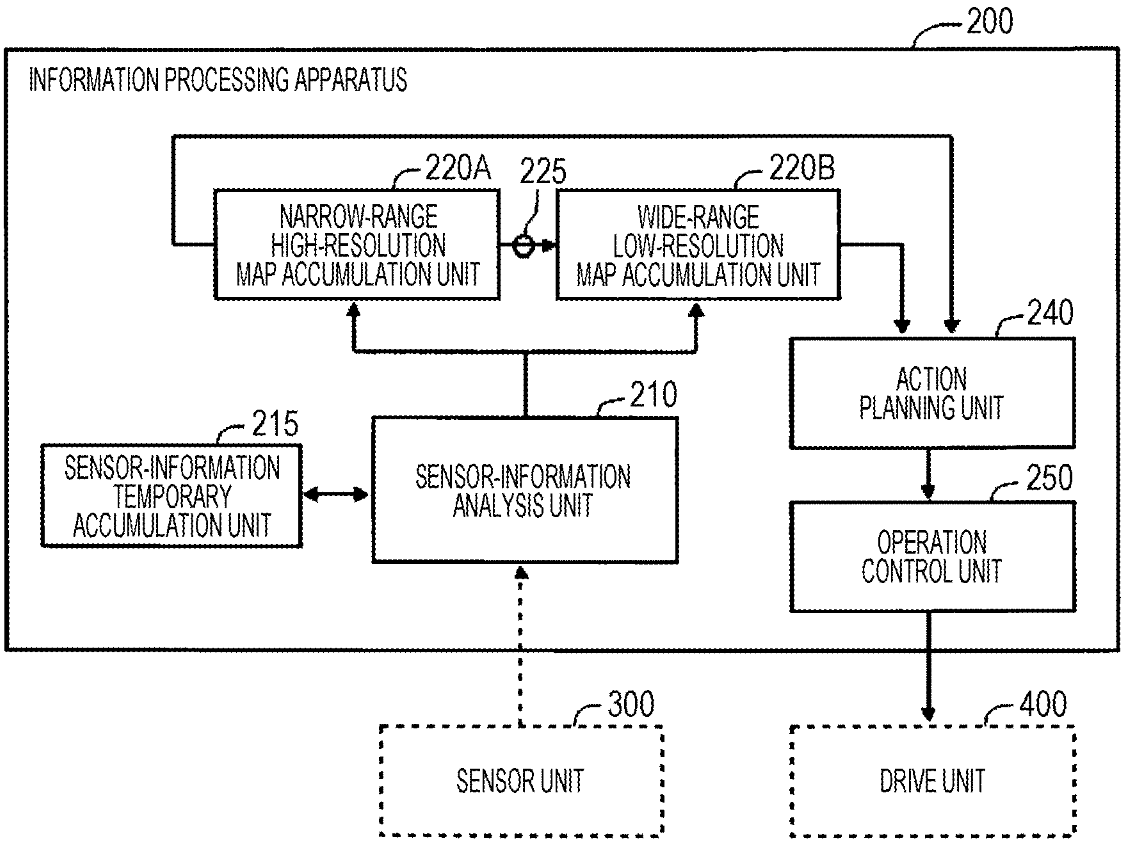
FIG. 14 is a block diagram illustrating an example of a configuration of an information processing apparatus according to a second modification.

FIG. 14 is a block diagram illustrating an example of a configuration of the information processing apparatus 200 according to a second modification.

The information processing apparatus 200 of the second modification is different from the information processing apparatus 200 of the present embodiment in that the apparatus does not perform a process of analyzing the environment map 500 and compensating for a missing part of environment information. In other words, the information processing apparatus 200 of the second modification is different from the information processing apparatus 200 of the present embodiment in that the apparatus does not include the narrow-range high-resolution map analysis unit 230A and the wide-range low-resolution map analysis unit 230B.

The other components of the information processing apparatus 200 of the second modification are similar to the above-described components of the information processing apparatus 200 of the present embodiment. Furthermore, the operations of the information processing apparatus 200 of the second modification are similar to the above-described operations of the information processing apparatus 200 of the present embodiment except that the apparatus does not perform a process of analyzing the environment map 500 and compensating for a missing part of environment information.

As described above, the information processing apparatus 200 of the second modification includes the sensor-information analysis unit 210, the narrow-range high-resolution map accumulation unit 220A (first map accumulation unit), and the wide-range low-resolution map accumulation unit 220B (second map accumulation unit).

Furthermore, an information processing method performed by the information processing apparatus 200 of the second modification includes step S100 of acquiring sensor information, step S200 of creating map base data, step S311 of updating a narrow-range high-resolution environment map, and step S321 of updating a wide-range low-resolution environment map.

With the information processing apparatus 200 of the second modification described above, it is possible to reduce the processing burden or the memory usage, and promptly switch between the narrow-range high-resolution environment map 500A and the wide-range low-resolution environment map 500B.

Note that the information processing apparatus 200 of the second modification includes neither the narrow-range high-resolution map analysis unit 230A nor the wide-range low-resolution map analysis unit 230B, but the information processing apparatus 200 of the present disclosure may include either the narrow-range high-resolution map analysis unit 230A or the wide-range low-resolution map analysis unit 230B.

Note that, in the mobile object 100, information in a region close to itself is the most important in many cases, and hence, it is preferable to grasp environment information in the region close to itself as detailedly as possible. Furthermore, as described above, in the wide-range low-resolution environment map 500B, a region of space therein that overlaps the narrow-range high-resolution environment map 500A is updated by using environment information in the narrow-range high-resolution environment map 500A. From this viewpoint, the information processing apparatus 200 preferably includes the narrow-range high-resolution map analysis unit 230A.

Third Modification

Figure 15:
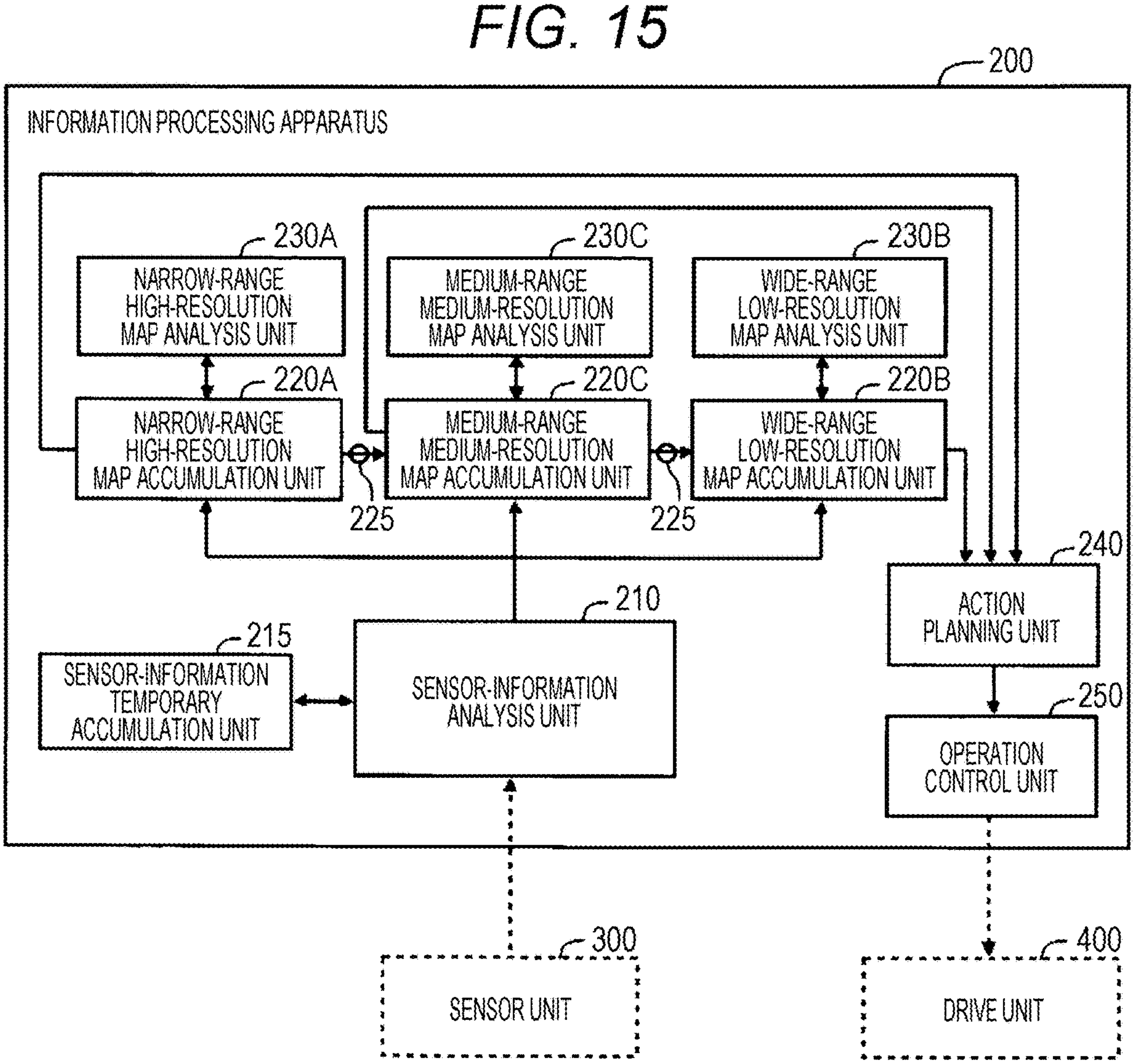
FIG. 15 is a block diagram illustrating an example of a configuration of an information processing apparatus according to a third modification.

FIG. 15 is a block diagram illustrating an example of a configuration of the information processing apparatus 200 according to a third modification.

The information processing apparatus 200 of the third modification is different from the information processing apparatus 200 of the present embodiment in using three environment maps 500 having different levels of resolution. In other words, the information processing apparatus 200 of the third modification is different from the information processing apparatus 200 of the present embodiment in that the apparatus holds a medium-range medium-resolution environment map, in addition to the narrow-range high-resolution environment map 500A and the wide-range low-resolution environment map 500B.

Here, the terms, "medium-range medium-resolution" mean a wider range and lower resolution than narrow-range high-resolution, and a narrower range and higher resolution than wide-range low-resolution.

The information processing apparatus 200 of the third modification further includes a medium-range medium-resolution map accumulation unit 220C and a medium-range medium-resolution map analysis unit 230C.

The sensor-information analysis unit 210 of the third modification creates medium-range medium-resolution map base data 550, in addition to the narrow-range high-resolution map base data 550A and the wide-range low-resolution map base data 550B.

The medium-range medium-resolution map accumulation unit 220C of the third modification updates the medium-range medium-resolution environment map 500 on the basis of data of the narrow-range high-resolution environment map 500A and the medium-range medium-resolution map base data 550.

The medium-range medium-resolution map analysis unit 230C of the third modification analyzes the medium-range medium-resolution environment map 500 held in the medium-range medium-resolution map accumulation unit 220C, and compensates for a missing part of environment information in the medium-range medium-resolution environment map 500.

The wide-range low-resolution map accumulation unit 220B of the third modification updates the wide-range low-resolution environment map 500B on the basis of data of the medium-range medium-resolution environment map 500 and the wide-range low-resolution map base data 550B.

In preparing action planning, the action planning unit 240 of the third modification selects one of the narrow-range high-resolution environment map 500A, the medium-range medium-resolution environment map 500, and the wide-range low-resolution environment map 500B according to the situation.

More specifically, the action planning unit 240 first prepares action planning on the basis of the wide-range low-resolution environment map 500B. Then, when it is determined that more accurate action planning is necessary, the action planning unit 240 prepares action planning on the basis of the medium-range medium-resolution environment map 500. Then, when it is determined that still more accurate action planning is necessary, the action planning unit 240 prepares action planning on the basis of the narrow-range high-resolution environment map 500A.

Here, depending on the required accuracy of action planning, action planning based on the narrow-range high-resolution environment map 500A may be prepared directly after action planning based on the wide-range low-resolution environment map 500B is prepared without preparation of action planning based on the medium-range medium-resolution environment map 500.

The other components of the information processing apparatus 200 of the third modification are similar to the above-described components of the information processing apparatus 200 of the present embodiment. Furthermore, the operations of the information processing apparatus 200 of the third modification are similar to the above-described operations of the information processing apparatus 200 of the present embodiment except for use of three environment maps 500 having different levels of resolution.

As described above, the information processing apparatus 200 of the third modification uses three environment maps 500 having different levels of resolution. With the information processing apparatus 200 of the third modification described above, it is possible to prepare action planning more suitable for the situation. Note that the information processing apparatus 200 of the present disclosure may use four or more environment maps 500 having different levels of resolution.

Fourth Modification

Figure 16:
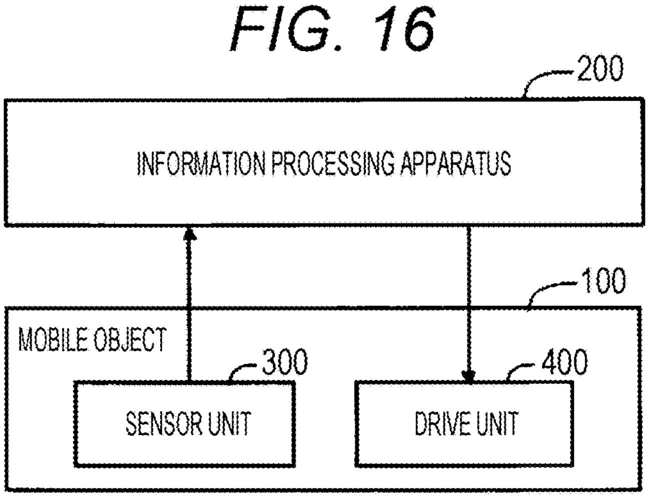
FIG. 16 is a block diagram illustrating an example of a configuration of an information processing apparatus according to a fourth modification.

FIG. 16 is a block diagram illustrating an example of a configuration of the information processing apparatus 200 according to a fourth modification.

The information processing apparatus 200 of the fourth modification is different from the information processing apparatus 200 of the present embodiment in that the apparatus is provided outside the mobile object 100.

The other components of the information processing apparatus 200 of the fourth modification are similar to the above-described components of the information processing apparatus 200 of the present embodiment. Furthermore, the operations of the information processing apparatus 200 of the fourth modification are similar to the above-described operations of the information processing apparatus 200 of the present embodiment.

As described above, the information processing apparatus 200 of the present disclosure may be provided outside the mobile object 100.

4. Example of Hardware Configuration

Next, an example of a hardware configuration of the information processing apparatus 200 will be described.

Figure 17:
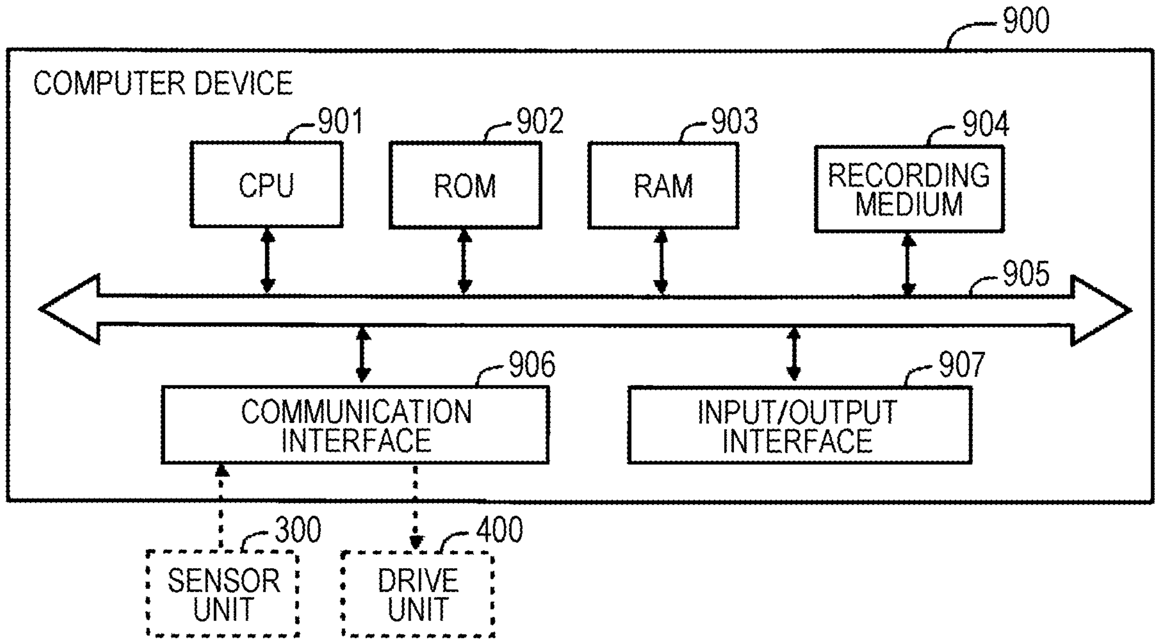
FIG. 17 is a block diagram illustrating an example of a hardware configuration of the information processing apparatus.

FIG. 17 is a block diagram illustrating an example of a hardware configuration of the information processing apparatus 200.

The information processing apparatus 200 includes a computer device 900.

The computer device 900 includes a central processing unit (CPU) 901, a read only memory (ROM) 902, a random access memory (RAM) 903, a recording medium 904, a bus 905, an input/output interface 906, and a communication interface 907.

The CPU 901 includes, for example, a processor such as a microprocessor, and executes a computer program recorded in the ROM 902 and the recording medium 904. The computer program is a program that implements each of the above-described functional components of the information processing apparatus 200. The computer program may be implemented by a combination of a plurality of programs and scripts, instead of one program. When the CPU 901 executes the computer program, each of the functional components of the information processing apparatus 200 is implemented.

The ROM 902 stores therein control data and the like such as the computer program and calculation parameters to be used by the CPU 901.

The RAM 903 temporarily stores therein the computer program executed by the CPU 901, data being used, and the like.

The recording medium 904 includes, for example, a magnetic storage device such as a hard disk drive (HDD), a semiconductor storage device such as a solid state drive (SSD), an optical storage device, a magneto-optical storage device, or the like, and stores therein the computer program executed by the CPU 901 and various data. The recording medium 904 may be an external recording medium (removable medium) such as a magnetic disk, an optical disk, a magneto-optical disk, or a semiconductor memory such as a memory card, a server on the Internet, or the like.

The bus 905 is a circuit for connecting the CPU 901, the ROM 902, the RAM 903, the recording medium 904, the communication interface 906, and the input/output interface 907 to each other.

The communication interface 906 is a circuit for performing wired or wireless communication to/from an external apparatus. The communication interface 906 is connected to the sensor unit 300 and the drive unit 400 of the mobile object 100. Then, the communication interface 906 performs communication related to sensor information from the sensor unit 300 and communication related to a signal for driving the drive unit 400.

The input/output interface 907 is a circuit for connecting to input devices such as various switches, a keyboard, a mouse, and a microphone, and output devices such as a display and a speaker.

Note that the computer program may be installed in the computer device 900 in advance or may be stored in a storage medium such as a CD-ROM. Furthermore, the computer program may be uploaded on the Internet.

Furthermore, the information processing apparatus 200 may include a single computer device 900, or may be configured as a system including a plurality of computer devices 900 connected to each other.

5. Example of Application to Vehicle Control System

Next, an example of application of the information processing apparatus 200 of the present disclosure to a vehicle control system 11 will be described.

Figure 18:
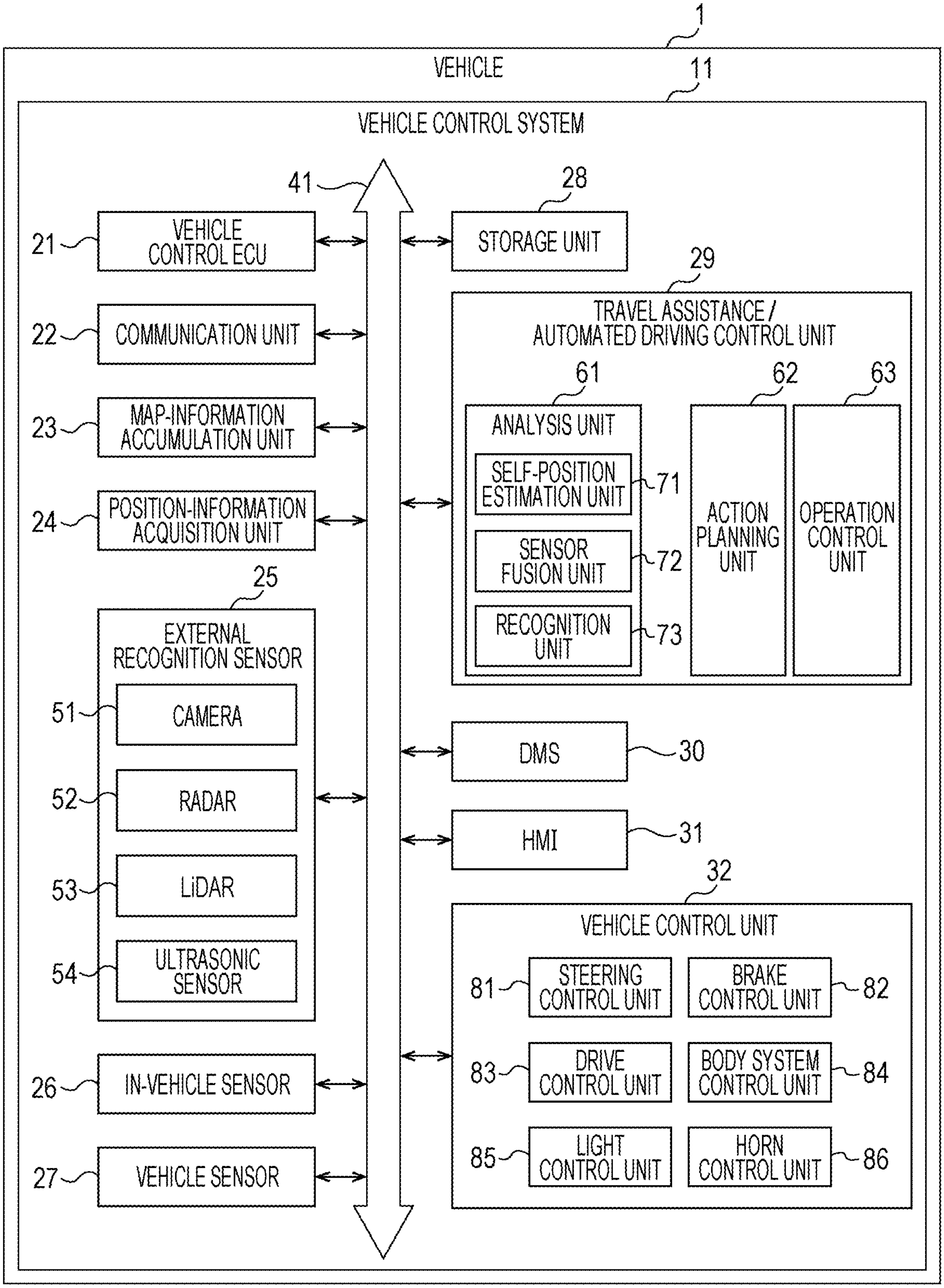
FIG. 18 is a block diagram illustrating an example of a configuration of a vehicle control system that is an example of a mobile apparatus system to which the technology of the present disclosure is applied.

FIG. 18 is a block diagram illustrating an example of a configuration of the vehicle control system 11 that is an example of a mobile apparatus system to which the technology of the present disclosure is applied.

The vehicle control system 11 is provided in a vehicle 1 and performs a processing related to travel assistance and automated driving of the vehicle 1.

The vehicle control system 11 includes a vehicle-control electronic control unit (ECU) 21, a communication unit 22, a map-information accumulation unit 23, a position-information acquisition unit 24, an external recognition sensor 25, an in-vehicle sensor 26, a vehicle sensor 27, a storage unit 28, a travel assistance/automated driving control unit 29, a driver monitoring system (DMS) 30, a human machine interface (HMI) 31, and a vehicle control unit 32.

The vehicle control ECU 21, the communication unit 22, the map-information accumulation unit 23, the position-information acquisition unit 24, the external recognition sensor 25, the in-vehicle sensor 26, the vehicle sensor 27, the storage unit 28, the travel assistance/automated driving control unit 29, the driver monitoring system (DMS) 30, the human machine interface (HMI) 31, and the vehicle control unit 32 are communicably connected to each other via a communication network 41. The communication network 41 includes, for example, an in-vehicle communication network, a bus, or the like that conforms to any digital bidirectional communication standard such as controller area network (CAN), local interconnect network (LIN), local area network (LAN), FlexRay (registered trademark), Ethernet (registered trademark), or the like. The communication network 41 may be selectively used depending on the type of data to be transmitted. For example, the CAN may be applied to data related to vehicle control, and the Ethernet may be applied to large-capacity data. Note that each unit of the vehicle control system 11 may be directly connected by wireless communication intended for relatively short distance communication such as near field communication (NFC) or Bluetooth (registered trademark), for example, without the intervention of the communication network 41.

Note that, with regard to communication between each unit of the vehicle control system 11 via the communication network 41, description of the communication network 41 will be omitted. For example, in a case where the vehicle control ECU 21 and the communication unit 22 perform communication via the communication network 41, it will be simply described that the vehicle control ECU 21 and the communication unit 22 perform communication.

For example, the vehicle control ECU 21 includes various processors such as a central processing unit (CPU) and a micro processing unit (MPU). The vehicle control ECU 21 controls all or a part of functions of the vehicle control system 11.

The communication unit 22 performs communication to/from various devices inside and outside a vehicle, another vehicle, servers, base stations, and the like, and transmits and receives various data. At that time, the communication unit 22 can perform communication using a plurality of communication methods.

Communication that can be performed between the communication unit 22 and the outside of a vehicle will be schematically described. The communication unit 22 communicates to/from a server (hereinafter referred to as an external server) or the like existing on an external network via a base station or an access point by a wireless communication method such as fifth generation mobile communication system (5G), long term evolution (LTE), dedicated short range communications (DSRC), or the like, for example. The external network on which the communication unit 22 performs communication is, for example, the Internet, a cloud network, a company-specific network, or the like. A communication method performed between the communication unit 22 and the external network is not limited to any particular method that is a wireless communication method capable of digital bidirectional communication between objects at a predetermined distance or longer from each other and at a communication speed of a predetermined speed or higher.

Furthermore, for example, the communication unit 22 can communicate to/from a terminal provided near an own vehicle using a peer-to-peer (P2P) technology. The terminal provided near an own vehicle is, for example, a terminal worn by a mobile object moving at a relatively low speed such as a pedestrian or a bicycle, a terminal installed at a fixed position in a store or the like, or a machine type communication (MTC) terminal. Moreover, the communication unit 22 can also perform V2X communication. The V2X communication refers to, for example, communication between an own vehicle and another object, such as communication between an own vehicle and another vehicle (vehicle-to-vehicle), communication between an own vehicle and a roadside machine (vehicle-to-infrastructure), communication between an own vehicle and the home (vehicle-to-home), or communication between an own vehicle and a terminal carried by a pedestrian (vehicle-to-pedestrian).

For example, the communication unit 22 can receive a program for updating software that controls the operations of the vehicle control system 11 from the outside (Over The Air). The communication unit 22 can further receive map information, traffic information, information regarding the surroundings of the vehicle 1, and the like from the outside. Furthermore, for example, the communication unit 22 can transmit information regarding the vehicle 1, information regarding the surroundings of the vehicle 1, and the like to the outside. Examples of information regarding the vehicle 1 transmitted to the outside by the communication unit 22 include, for example, data indicating a state of the vehicle 1, a result of recognition performed by a recognition unit 73, and the like. Moreover, for example, the communication unit 22 performs communication adapted to a vehicle emergency call system such as eCall.

For example, the communication unit 22 receives an electromagnetic wave transmitted by a road traffic information communication system (vehicle information and communication system (VICS), registered trademark), such as a radio wave beacon, an optical beacon, or FM multiplex broadcasting.

Communication that can be performed between the communication unit 22 and the inside of a vehicle will be schematically described. The communication unit 22 can communicate to/from each device in a vehicle using, for example, wireless communication. The communication unit 22 can perform wireless communication to/from an in-vehicle device by a communication method capable of digital bidirectional communication at a predetermined communication speed or higher using wireless communication such as wireless LAN, Bluetooth, NFC, or wireless USB (WUSB), for example. In addition thereto, the communication unit 22 can also communicate to/from each device in a vehicle using wired communication. For example, the communication unit 22 can communicate to/from each device in a vehicle by wired communication via a cable connected to a connection terminal not illustrated. The communication unit 22 can communicate to/from each device in a vehicle by a communication method capable of digital bidirectional communication at a predetermined communication speed or higher using wired communication such as universal serial bus (USB), high-definition multimedia interface (HDMI) (registered trademark), or mobile high-definition link (MHL).

Here, the in-vehicle device refers to, for example, a device that is not connected to the communication network 41 in a vehicle. As the in-vehicle device, for example, a mobile apparatus or a wearable device carried by an occupant such as a driver, an information device carried onto a vehicle and temporarily installed, or the like can be considered.

The map-information accumulation unit 23 accumulates therein one or both of a map acquired from the outside and a map created in the vehicle 1. For example, the map-information accumulation unit 23 accumulates therein a three-dimensional high-accuracy map, a global map that has lower accuracy than the high-accuracy map and covers a wide area, and the like.

The high-accuracy is, for example, a dynamic map, a point cloud map, a vector map, or the like. The dynamic map is, for example, a map including four layers of dynamic information, semi-dynamic information, semi-static information, and static information, and is provided to the vehicle 1 from the external server or the like. The point cloud map is a map including point clouds (point cloud data). The vector map is, for example, a map in which traffic information such as a lane and a position of a traffic light is associated with a point cloud map and adapted to an advanced driver assistance system (ADAS) or autonomous driving (AD).

The point cloud map and the vector map may be provided from, for example, the external server or the like, or may be created in the vehicle 1 as a map for performing matching with a local map to be described later on the basis of a result of sensing by a camera 51, a radar 52, a LiDAR 53, or the like, and may be accumulated in the map-information accumulation unit 23. Furthermore, in a case where the high-accuracy map is provided from the external server or the like, for example, map data of several hundred meters square regarding a planned path on which the vehicle 1 is to travel in the future is acquired from the external server or the like in order to reduce the communication capacity.

The position-information acquisition unit 24 receives a global navigation satellite system (GNSS) signal from a GNSS satellite, and acquires position information about the vehicle 1. The acquired position information is supplied to the travel assistance/automated driving control unit 29. Note that the position-information acquisition unit 24 is not limited to a method using a GNSS signal, and may acquire position information using, for example, a beacon.

The external recognition sensor 25 includes various sensors used for recognizing an external situation of the vehicle 1, and supplies sensor data from each sensor to each unit of the vehicle control system 11. The type and number of sensors included in the external recognition sensor 25 are randomly selected.

For example, the external recognition sensor 25 includes the camera 51, the radar 52, the light detection and ranging or laser imaging detection and ranging sensor (LiDAR) 53, and the ultrasonic sensor 54. In addition thereto, the external recognition sensor 25 may include one or more types of sensors among the camera 51, the radar 52, the LiDAR 53, and the ultrasonic sensor 54. The numbers of the cameras 51, the radars 52, the LiDAR 53, and the ultrasonic sensors 54 are not limited to any particular number that can be installed in the vehicle 1 in practice. Furthermore, the types of sensors included in the external recognition sensor 25 are not limited to those in this example, and the external recognition sensor 25 may include another type of sensor. An example of a sensing area of each sensor included in the external recognition sensor 25 will be described later.

Note that an imaging method of the camera 51 is not limited to any particular method. For example, cameras that perform various imaging methods capable of ranging, such as a time-of-flight (ToF) camera, a stereo camera, a monocular camera, and an infrared camera, can be applied to the camera 51 as necessary. In addition thereto, the camera 51 may be one that simply acquires a captured image without regard to ranging.

Furthermore, for example, the external recognition sensor 25 can include an environment sensor for detecting environment of the vehicle 1. The environment sensor is a sensor for detecting environment such as weather, climate, and brightness, and can include various sensors such as a raindrop sensor, a fog sensor, a sunshine sensor, a snow sensor, and an illuminance sensor, for example.

Moreover, for example, the external recognition sensor 25 includes a microphone used for detecting a sound around the vehicle 1, a position of a sound source, and the like.

The in-vehicle sensor 26 includes various sensors for detecting information inside a vehicle, and supplies sensor data from each sensor to each unit of the vehicle control system 11. The type and number of various sensors included in the in-vehicle sensor 26 are not limited to any particular type or number that can be installed in the vehicle 1 in practice.

For example, the in-vehicle sensor 26 can include one or more types of sensors among a camera, a radar, a seating sensor, a steering wheel sensor, a microphone, and a biosensor. As the camera included in the in-vehicle sensor 26, for example, cameras that perform various imaging methods capable of ranging, such as a ToF camera, a stereo camera, a monocular camera, and an infrared camera, can be used. In addition thereto, the camera included in the in-vehicle sensor 26 may be one that simply acquires a captured image without regard to ranging. The biosensor included in the in-vehicle sensor 26 is provided, for example, on a seat, a steering wheel, or the like, and detects various kinds of biological information about an occupant such as a driver.

The vehicle sensor 27 includes various sensors for detecting a state of the vehicle 1, and supplies sensor data from each sensor to each unit of the vehicle control system 11. The type and number of various sensors included in the vehicle sensor 27 are not limited to any particular type or number that can be installed in the vehicle 1 in practice.

For example, the vehicle sensor 27 includes a speed sensor, an acceleration sensor, an angular velocity sensor (gyro sensor), and an inertial measurement unit (IMU) in which those sensors are integrated. For example, the vehicle sensor 27 includes a steering-angle sensor that detects a steering angle of a steering wheel, a yaw-rate sensor, an accelerator sensor that detects an operation amount of an accelerator pedal, and a brake sensor that detects an operation amount of a brake pedal. For example, the vehicle sensor 27 includes a rotation sensor that detects the number of rotations of an engine or a motor, an air-pressure sensor that detects an air pressure of a tire, a slip-ratio sensor that detects the slip-ratio of a tire, and a wheel-speed sensor that detects the rotation speed of a wheel. For example, the vehicle sensor 27 includes a battery sensor that detects remaining battery power and a temperature of a battery, and an impact sensor that detects external impact.

The storage unit 28 includes at least one of a nonvolatile storage medium or a volatile storage medium, and stores therein data and a program. The storage unit 28 is used as, for example, an electrically erasable programmable read only memory (EEPROM) and a random access memory (RAM), and, as a storage medium, a magnetic storage device such as a hard disc drive (HDD), a semiconductor storage device, an optical storage device, and a magneto-optical storage device can be applied. The storage unit 28 stores therein various programs and data used by each unit of the vehicle control system 11. For example, the storage unit 28 includes an event data recorder (EDR) and a data storage system for automated driving (DSSAD), and stores therein information about the vehicle 1 before and after an event such as an accident and information acquired by the in-vehicle sensor 26.

The travel assistance/automated driving control unit 29 controls travel assistance and automated driving of the vehicle 1. For example, the travel assistance/automated driving control unit 29 includes an analysis unit 61, an action planning unit 62, and an operation control unit 63.

The analysis unit 61 performs a process of analyzing a situation of the vehicle 1 and the surroundings. The analysis unit 61 includes a self-position estimation unit 71, a sensor fusion unit 72, and a recognition unit 73.

The self-position estimation unit 71 estimates a self-position of the vehicle 1 on the basis of sensor data from the external recognition sensor 25 and a high-accuracy map accumulated in the map-information accumulation unit 23. For example, the self-position estimation unit 71 creates a local map on the basis of sensor data from the external recognition sensor 25, and performs matching between the local map and the high-accuracy map, to estimate a self-position of the vehicle 1. The position of the vehicle 1 is based on, for example, the center of a rear-wheel axle.

The local map is, for example, a three-dimensional high-accuracy map created using a technology such as simultaneous localization and mapping (SLAM), or the like, an occupancy grid map, or the like. The three-dimensional high-accuracy map is, for example, a point cloud map described above, or the like. The occupancy grid map is a map in which a three-dimensional or two-dimensional space around the vehicle 1 is divided into grids of a predetermined size, and an occupancy state of an object is indicated in units of grids. The occupancy state of an object is indicated by, for example, the presence or absence, or existence probability, of an object. The local map is also used for processes of detecting and recognizing a situation outside the vehicle 1, performed by the recognition unit 73, for example.

Note that the self-position estimation unit 71 may estimate a self-position of the vehicle 1 on the basis of position information acquired by the position-information acquisition unit 24 and sensor data from the vehicle sensor 27.

The sensor fusion unit 72 performs a sensor fusion process of combining a plurality of different kinds of sensor data (for example, image data supplied from the camera 51 and sensor data supplied from the radar 52), to acquire new information. Methods of combining different kinds of sensor data include integration, fusion, association, and the like.

The recognition unit 73 performs a detection process of a situation outside the vehicle 1 and a recognition process of a situation outside the vehicle 1.

For example, the recognition unit 73 performs the detection process and the recognition process of a situation outside a vehicle 1 on the basis of information from the external recognition sensor 25, information from the self-position estimation unit 71, information from the sensor fusion unit 72, and the like.

Specifically, for example, the recognition unit 73 performs the detection process and the recognition process of an object around the vehicle 1, or the like. The detection process of an object is a process of detecting the presence or absence, size, shape, position, motion, and the like of the object. The recognition process of an object is, for example, a process of recognizing the attribute such as a type of an object or identifying a specific object. However, the detection process and the recognition process are not necessarily clearly distinguished, and may overlap.

For example, the recognition unit 73 detects an object around the vehicle 1 by performing clustering in which point clouds based on sensor data from the radar 52, the LiDAR 53, or the like, are classified into clusters of point clouds. Thus, the presence or absence, size, shape, and position of an object around the vehicle 1 are detected.

For example, the recognition unit 73 detects motion of an object around the vehicle 1 by performing tracking for tracking motion of the cluster of point clouds classified by clustering. Thus, the speed and the direction of travel (movement vector) of an object around the vehicle 1 are detected.

For example, the recognition unit 73 detects or recognizes a vehicle, a person, a bicycle, an obstacle, a structure, a road, a traffic light, a traffic sign, a road sign, and the like on the basis of image data supplied from the camera 51. Furthermore, the recognition unit 73 may recognize the category of an object around the vehicle 1 by performing a recognition process such as semantic segmentation.

For example, the recognition unit 73 can perform a process of recognizing traffic rules around the vehicle 1 on the basis of a map accumulated in the map-information accumulation unit 23, a result of estimation of a self-position provided from the self-position estimation unit 71, and a result of recognition of an object around the vehicle 1 provided from the recognition unit 73. By this process, the recognition unit 73 can recognize a position and a state of a traffic light, the content of a traffic sign and a road sign, the content of traffic regulations, a travelable lane, and the like.

For example, the recognition unit 73 can perform a process of recognizing surrounding environment of the vehicle 1. As the surrounding environment to be recognized by the recognition unit 73, weather, temperature, humidity, brightness, a state of a road surface, and the like can be considered.

The action planning unit 62 prepares action planning of the vehicle 1. For example, the action planning unit 62 performs processes of Global path planning and path tracking, to prepare action planning.

Note that Global path planning is a process of planning a rough path from a start to a goal. The path planning includes a process of performing local path planning called a trajectory planning that enables safe and smooth traveling in the vicinity of the vehicle 1 in consideration of the motion characteristics of the vehicle 1 in the planned path.

The path tracking is a process of planning an operation for safe and accurate travel along a path planned by the Global path planning within a planned time. For example, the action planning unit 62 can calculate a desired speed and a desired angular velocity of the vehicle 1 on the basis of a result of the process of path tracking.

The operation control unit 63 controls the operations of the vehicle 1 in order to implement action planning prepared by the action planning unit 62. For example, the operation control unit 63 controls a steering control unit 81, a brake control unit 82, and a drive control unit 83 included in the vehicle control unit 32 described later, to control acceleration/deceleration and the direction so that the vehicle 1 travels on a trajectory calculated by trajectory planning. For example, the operation control unit 63 performs coordinated control for the purpose of implementing the functions of the ADAS such as collision avoidance or impact mitigation, follow-up traveling, vehicle-speed maintaining traveling, warning of collision of an own vehicle, warning of lane deviation of an own vehicle, and the like. For example, the operation control unit 63 performs coordinated control for the purpose of automated driving or the like in which a vehicle autonomously travels without depending on the operation of a driver.

The DMS 30 performs a process of authenticating a driver, a process of recognizing the condition of the driver, and the like on the basis of sensor data from the in-vehicle sensor 26, input data input to the HMI 31 described later, and the like. As a driver's condition to be recognized, for example, a physical condition, a wakefulness level, a concentration level, a fatigue level, a line-of-sight direction, a drunkenness level, a driving operation, a posture, and the like can be considered.

Note that the DMS 30 may perform a process of authenticating an occupant other than a driver, and a process of recognizing a condition of the occupant. Furthermore, for example, the DMS 30 may perform a process of recognizing a situation inside a vehicle on the basis of sensor data from the in-vehicle sensor 26. As the situation inside the vehicle to be recognized, for example, temperature, humidity, brightness, odor, and the like can be considered.

The HMI 31 receives various data, instructions, and the like, and presents various data to a driver and the like.

Inputting of data in the HMI 31 will be schematically described. The HMI 31 includes an input device for a person to input data. The HMI 31 generates an input signal on the basis of data, an instruction, or the like input using the input device, and supplies the input signal to each unit of the vehicle control system 11. The HMI 31 includes, for example, an operation unit such as a touch panel, a button, a switch, and a lever as the input device. In addition thereto, the HMI 31 may further include an input device capable of inputting information by a method using voice, gesture, or the like, other than manual operation. Moreover, the HMI 31 may use, for example, a remote control device using infrared rays or radio waves, or an external connection device such as a mobile device or a wearable device adapted to the operation of the vehicle control system 11, as the input device.

Presentation of data by the HMI 31 will be schematically described. The HMI 31 generates visual information, auditory information, and haptic information regarding an occupant or the outside of a vehicle. Furthermore, the HMI 31 performs output control for controlling outputting, output content, an output time, an output method, and the like of each piece of generated information. The HMI 31 generates and outputs, for example, information indicated by an image or light such as an operation screen, a status indicator of the vehicle 1, a warning indicator, a monitor image showing a situation around the vehicle 1, as visual information. Furthermore, the HMI 31 generates and outputs, for example, information indicated by sounds such as voice guidance, a warning sound, and a warning message, as auditory information. Moreover, the HMI 31 generates and outputs, for example, information given to the sense of touch of an occupant through force, vibration, motion, or the like, as haptic information.

As an output device with which the HMI 31 outputs visual information, for example, a display device that displays an image by itself to present visual information or a projector device that projects an image to present visual information can be applied. Note that the display device may be a device that displays visual information in the field of view of an occupant, such as a head-up display, a transmissive display, or a wearable device having an augmented reality (AR) function, for example, in addition to a display device having an ordinary display. Furthermore, the HMI 31 can use a display device included in a navigation device, an instrument panel, a camera monitoring system (CMS), an electronic mirror, a lamp, or the like provided in the vehicle 1, as the output device that outputs visual information.

As the output device with which the HMI 31 outputs auditory information, for example, an audio speaker, a headphone, or an earphone can be applied.

As the output device with which the HMI 31 outputs haptic information, for example, a haptic element using a haptic technology can be applied. The haptic element is provided, for example, at a portion to be touched by an occupant of the vehicle 1, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including a steering wheel and the like, an electric power steering, and the like. The steering control unit 81 includes, for example, a steering ECU that controls the steering system, an actuator that drives the steering system, and the like.

The brake control unit 82 performs detection, control, and the like of a state of a brake system of the vehicle 1. The brake system includes, for example, a brake mechanism including a brake pedal or the like, an antilock brake system (ABS), a regenerative brake mechanism, and the like. The brake control unit 82 includes, for example, a brake ECU that controls the brake system, an actuator that drives the brake system, and the like.

The drive control unit 83 performs detection, control, and the like of a state of a drive system of the vehicle 1. The drive system includes, for example, a driving-force generation device for generating driving force of an accelerator pedal, an internal combustion engine, a driving motor, or the like, a driving-force transmission mechanism for transmitting driving force to wheels, and the like. The drive control unit 83 includes, for example, a drive ECU that controls the drive system, an actuator that drives the drive system, and the like.

The body system control unit 84 performs detection, control, and the like of a state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a body system ECU that controls the body system, an actuator that drives the body system, and the like.

The light control unit 85 performs detection, control, and the like of states of various lights of the vehicle 1. As the lights to be controlled, for example, a headlight, a backlight, a fog light, a turn signal, a brake light, a projection light, a bumper indicator, and the like can be considered. The light control unit 85 includes a light ECU that controls the lights, an actuator that drives the lights, and the like.

The horn control unit 86 performs detection, control, and the like of a state of a car horn of the vehicle 1. The horn control unit 86 includes, for example, a horn ECU that controls the car horn, an actuator that drives the car horn, and the like.

Figure 19:
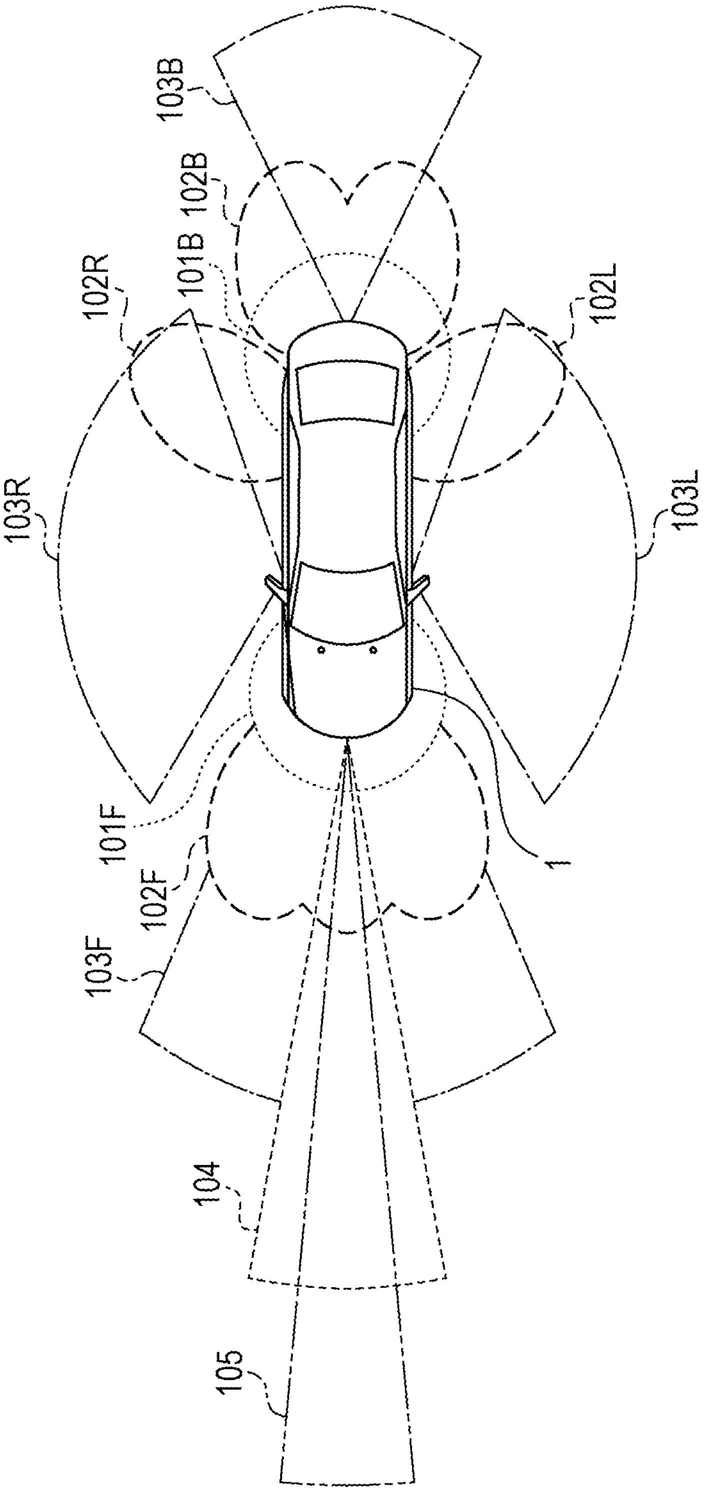
FIG. 19 is a view illustrating an example of a sensing area.

FIG. 19 is a view illustrating an example of a sensing area to be sensed by the camera 51, the radar 52, the LiDAR 53, the ultrasonic sensor 54, and the like of the external recognition sensor 25 in FIG. 18. Note that FIG. 2 schematically illustrates the vehicle 1 as viewed from above, in which the left-end side is the front-end (front) side of the vehicle 1 and the right-end side is the rear-end (rear) side of the vehicle 1.

A sensing area 101F and a sensing area 101B are examples of a sensing area of the ultrasonic sensor 54. The sensing area 101F covers the periphery of the front end of the vehicle 1 with a plurality of the ultrasonic sensors 54. The sensing area 101B covers the periphery of the rear end of the vehicle 1 with the plurality of ultrasonic sensors 54.

Results of sensing in the sensing area 101F and the sensing area 101B are used, for example, for parking assistance of the vehicle 1 or the like.

Sensing areas 102F to 102B are examples of a sensing area of the radar 52 for a short range or a medium range. The sensing area 102F covers a position farther than the sensing area 101F in front of the vehicle 1. The sensing area 102B covers a position farther than the sensing area 101B behind the vehicle 1. A sensing area 102L covers the periphery of a rear portion of the left side surface of the vehicle 1. A sensing area 102R covers the periphery of a rear portion of the right side surface of the vehicle 1.

A result of sensing in the sensing area 102F is used, for example, for detection or the like of a vehicle, a pedestrian, or the like present in front of the vehicle 1. A result of sensing in the sensing area 102B is used, for example, for a function of collision prevention behind the vehicle 1, or the like. Results of sensing in the sensing areas 102L and 102R are used, for example, for detection or the like of an object at a blind spot on a side of the vehicle 1.

Sensing areas 103F to 103B are examples of a sensing area to be sensed by the camera 51. The sensing area 103F covers a position farther than the sensing area 102F in front of the vehicle 1. The sensing area 103B covers a position farther than the sensing area 102B behind the vehicle 1. A sensing area 103L covers the periphery of the left side surface of the vehicle 1. A sensing area 103R covers the periphery of the right side surface of the vehicle 1.

A result of sensing in the sensing area 103F can be used, for example, for recognition of a traffic light or a traffic sign, a lane departure prevention assist system, and an automatic headlight control system. A result of sensing in the sensing area 103B can be used for, for example, parking assistance and a surround view system. Results of sensing in the sensing area 103L and the sensing area 103R can be used for a surround view system, for example.

A sensing area 104 is an example of a sensing area of the LiDAR 53. The sensing area 104 covers a position farther than the sensing area 103F in front of the vehicle 1. Meanwhile, the sensing area 104 has a lateral range that is narrower than that of the sensing area 103F.

A result of sensing in the sensing area 104 is used, for example, for detection of an object such as a neighboring vehicle.

A sensing area 105 is an example of a sensing area of the radar 52 for a long range. The sensing area 105 covers a position farther than the sensing area 104 in front of the vehicle 1. Meanwhile, the sensing area 105 has a lateral range that is narrower than that of the sensing area 104.

A result of sensing in the sensing area 105 is used, for example, for adaptive cruise control (ACC), emergency braking, collision avoidance, and the like.

Note that the sensing areas of the respective sensors of the camera 51, the radar 52, the LiDAR 53, and the ultrasonic sensor 54 included in the external recognition sensor 25 may have various configurations other than those in FIG. 2. Specifically, the ultrasonic sensor 54 may also sense the side of the vehicle 1, or the LiDAR 53 may sense the rear of the vehicle 1. Furthermore, the setting position of each sensor is not limited to that in each example described above. Furthermore, the number of sensors may be one or more.

The information processing apparatus 200 of the present disclosure is applied to the vehicle control system 11 described above as follows.

As a premise, the above-described vehicle 1 corresponds to the mobile object 100 of the present disclosure. Furthermore, the external recognition sensor 25 of the vehicle control system 11 corresponds to the sensor unit 300 of the present disclosure. Furthermore, the vehicle control unit 32 of the vehicle control system 11 corresponds to the drive unit 400 of the present disclosure.

Then, the map-information accumulation unit 23 of the vehicle control system 11 has the same configuration as that of the map accumulation units 220, 220A, and 220B of the present disclosure. Furthermore, the analysis unit 61 of the vehicle control system 11 has the same configuration as that of the sensor-information analysis unit 210 and the map analysis units 230, 230A, and 230B of the present disclosure. Furthermore, the action planning unit 62 of the vehicle control system 11 has the same configuration as that of the action planning unit 240 of the present disclosure. Furthermore, the operation control unit 63 of the vehicle control system 11 has the same configuration as that of the operation control unit 250 of the present disclosure.

Thus, the vehicle control system 11 includes the information processing apparatus 200.

With the vehicle control system 11 described above, it is possible to record detailed information in the environment map 500, promptly switch between the narrow-range high-resolution environment map 500A and the wide-range low-resolution environment map 500B while reducing the processing burden or the memory usage, and reduce the number of the sensors 310 arranged in the mobile object 100.

6. Conclusion

An example of the embodiment of the present disclosure has been described above, but the present disclosure can be implemented in various other forms. For example, various modifications, replacements, omissions, or combinations thereof can be made within a scope not departing from the gist of the present disclosure. Forms in which such modifications, replacements, omissions, and the like are made are also included in the scope of the present disclosure and are likewise included in the invention described in the claims and the equivalent scopes thereof.

Furthermore, the effects of the present disclosure described in the present specification are mere examples, and other effects may be provided.

Note that, the present disclosure can also have the following configurations.

[Item 1]

An information processing apparatus including:

a sensor-information analysis unit configured to analyze sensor information and create map base data that is data used for updating an environment map including environment information;

a map accumulation unit configured to hold the environment map and update the environment map on the basis of the map base data; and a map analysis unit configured to analyze the environment map and compensate for or correct the environment information in the environment map.

[Item 2]

The information processing apparatus according to Item 1, in which the map analysis unit compensates for a missing part of the environment information in the environment map.

[Item 3]

The information processing apparatus according to Item 2, in which the map analysis unit estimates content of a missing part of a predetermined kind of environment information by evaluating continuity of another kind of environment information, and provides the estimated content as compensation for the missing part.

[Item 4]

The information processing apparatus according to Item 2 or 3, in which the map analysis unit compensates for the missing part of the environment information in a format in which the environment information compensated for by the map analysis unit can be identified.

[Item 5]

The information processing apparatus according to any of Items 1 to 4, in which the sensor-information analysis unit creates first map base data having a first range and first resolution and a second map base data having a second range wider than the first range and second resolution lower than the first resolution, the map accumulation unit includes a first map accumulation unit configured to update a first environment map having a third range and the first resolution on the basis of the first map base data, and a second map accumulation unit configured to update a second environment map having a fourth range wider than the third range and the second resolution on the basis of the second map base data, and the map analysis unit analyzes at least the first environment map or the second environment map and compensates for or corrects environment information in the analyzed environment map.

[Item 6]

An information processing apparatus including:

a sensor-information analysis unit configured to analyze sensor information and create map base data that is data used for updating an environment map including environment information; and a map accumulation unit configured to hold the environment map and update the environment map on the basis of the map base data, in which the sensor-information analysis unit creates first map base data having a first range and first resolution and a second map base data having a second range wider than the first range and second resolution lower than the first resolution, and the map accumulation unit includes a first map accumulation unit configured to update a first environment map having a third range and the first resolution on the basis of the first map base data, and a second map accumulation unit configured to update a second environment map having a fourth range wider than the third range and the second resolution on the basis of the second map base data.

[Item 7]

The information processing apparatus according to Item 6, in which the second map base data does not include at least a part of data in a region overlapping the first map base data, and the second map accumulation unit updates the second environment map on the basis of environment information in the first environment map and the second map base data.

[Item 8]

The information processing apparatus according to Item 6 or 7, further including an action planning unit configured to prepare action planning of a mobile object, in which the action planning unit selects one of the first environment map and the second environment map according to a situation, and prepares the action planning on the basis of the selected environment map.

[Item 9]

The information processing apparatus according to Item 8, in which the action planning unit prepares the action planning on the basis of the second environment map, and prepares the action planning on the basis of the first environment map in a case where it is determined that more accurate action planning is necessary.

[Item 10]

The information processing apparatus according to any of Items 6 to 9, further including a map analysis unit configured to analyze at least the first environment map or the second environment map and compensate for or correct environment information in the analyzed environment map.

[Item 11]

An information processing method including:

a step of acquiring sensor information;

a step of analyzing the sensor information and creating map base data that is data used for updating an environment map including environment information;

a step of updating the environment map on the basis of the map base data; and a step of analyzing the environment map, to compensate for or correct the environment information in the environment map.

[Item 12]

An information processing method including:

a step of acquiring sensor information;

a step of analyzing the sensor information and creating map base data that is data used for updating an environment map including environment information; and a step of updating the environment map on the basis of the map base data, in which the step of creating the map base data includes a step of creating first map base data having a first range and first resolution and a step of creating second map base data having a second range wider than the first range and second resolution lower than the first resolution, and the step of updating the environment map includes a step of updating a first environment map having a third range and the first resolution on the basis of the first map base data, and a step of updating a second environment map having a fourth range wider than the third range and the second resolution on the basis of the second map base data.

[Item 13]

A computer program that causes a computer to perform:

a step of acquiring sensor information;

a step of analyzing the sensor information and creating map base data that is data used for updating an environment map including environment information;

a step of updating the environment map on the basis of the map base data; and a step of analyzing the environment map, to compensate for or correct the environment information in the environment map.

[Item 14]

A computer program that causes a computer to perform:

a step of acquiring sensor information;

a step of analyzing the sensor information and creating map base data that is data used for updating an environment map including environment information; and a step of updating the environment map on the basis of the map base data, in which the step of creating the map base data includes a step of creating first map base data having a first range and first resolution and a step of creating second map base data having a second range wider than the first range and second resolution lower than the first resolution, and the step of updating the environment map includes a step of updating a first environment map having a third range and the first resolution on the basis of the first map base data, and a step of updating a second environment map having a fourth range wider than the third range and the second resolution on the basis of the second map base data.

REFERENCE SIGNS LIST

100 Mobile object
200 Information processing apparatus
210 Sensor-information analysis unit
215 Sensor-information temporary accumulation unit
220 Map accumulation unit
220A Narrow-range high-resolution map accumulation unit (first map accumulation unit)
220B Wide-range low-resolution map accumulation unit (second map accumulation unit)
220C Medium-range medium-resolution map accumulation unit
225 Data conversion unit
230 Map analysis unit
230A Narrow-range high-resolution map analysis unit (first map analysis unit)
230B Wide-range low-resolution map analysis unit (second map analysis unit)
230C Medium-range medium-resolution map analysis unit
240 Action planning unit
250 Operation control unit
300 Sensor unit
310 Sensor
311 First LiDAR
312 Second LiDAR
313 RGB camera
320 Sensor control unit
400 Drive unit
500 Environment map
500A Narrow-range high-resolution environment map (first environment map)
500B Wide-range low-resolution environment map (second environment map)
510 Voxel
550 Map base data
550A Narrow-range high-resolution map base data (first map base data)
550B Wide-range low-resolution map base data (second map base data)
610 Slope
620 Obstacle
900 Computer device
901 CPU
902 ROM
903 RAM
904 Magnetic recording medium
905 Bus
906 Communication interface
907 Input/output interface

The invention claimed is:

1. An information processing apparatus comprising:

processing circuitry configured to analyze sensor information acquired by a sensor sensing an environment around a mobile object and create map base data that is data used for updating an environment map that describes the environment around the mobile object and includes environment information recorded in association with each of a plurality of voxels of the environment map;

store the environment map and update the environment map based on the map base data;

analyze the environment map and compensate for a missing part of the environment information in the environment map;

estimate content of a missing part of a predetermined kind of environment information in a first region of the environment map where the predetermined kind of environment information is missing by evaluating continuity of another kind of environment information in the environment map with a second region of the environment map where the predetermined kind of environment information is recorded;

provide the estimated content as compensation for the missing part;

prepare action planning of the mobile object based on the environment map; and control an actuator to move the mobile object through the environment according to the action planning.

2. The information processing apparatus according to claim 1, wherein the processing circuitry is further configured to compensate for the missing part of the environment information in a format in which the environment information compensated for is identified.

3. The information processing apparatus according to claim 1, wherein the processing circuitry is further configured to create first map base data having a first range and first resolution and a second map base data having a second range wider than the first range and second resolution lower than the first resolution, update a first environment map having a third range and the first resolution on a basis of the first map base data, and update a second environment map having a fourth range wider than the third range and the second resolution on a basis of the second map base data, and analyze at least the first environment map or the second environment map and compensate for or correct environment information in the analyzed environment map.

4. An information processing apparatus comprising:

processing circuitry configured to analyze sensor information and create map base data that is data used for updating an environment map including environment information;

hold the environment map and update the environment map on a basis of the map base data;

create first map base data having a first range and first resolution and a second map base data having a second range wider than the first range and second resolution lower than the first resolution, wherein the second map base data does not include at least a part of data in a region overlapping the first map base data;

update a first environment map having a third range and the first resolution on a basis of the first map base data; and update a second environment map having a fourth range wider than the third range and the second resolution on a basis of environment information in the first environment map and the second map base data, wherein a mobile object autonomously moves through an environment based on at least one of the first environment map or the second environment map.

5. The information processing apparatus according to claim 4, wherein the processing circuitry is further configured to prepare action planning of a mobile object, select one of the first environment map and the second environment map according to a situation, and prepare the action planning on a basis of the selected environment map.

6. The information processing apparatus according to claim 5, wherein the processing circuitry is further configured to prepare the action planning on a basis of the second environment map, and prepare the action planning on a basis of the first environment map in a case where it is determined that more accurate action planning is necessary.

7. The information processing apparatus according to claim 4, wherein the processing circuitry is further configured to analyze at least the first environment map or the second environment map and compensate for or correct environment information in the analyzed environment map.

8. An information processing method comprising:

acquiring sensor information acquired by a sensor sensing an environment around a mobile object;

analyzing the sensor information and creating map base data that is data used for updating an environment map that describes the environment around the mobile object and includes environment information recorded in association with each of a plurality of voxels of the environment map;

updating the environment map based on the map base data;

analyzing the environment map to compensate for a missing part of the environment information in the environment map;

estimating content of a missing part of a predetermined kind of environment information in a first region of the environment map where the predetermined kind of environment information is missing by evaluating continuity of another kind of environment information in the environment map with a second region of the environment map where the predetermined kind of environment information is recorded;

providing the estimated content as compensation for the missing part;

preparing action planning of the mobile object based on the environment map; and controlling an actuator to move the mobile object through the environment according to the action planning.

9. An information processing method comprising:

acquiring sensor information;

analyzing the sensor information and creating map base data that is data used for updating an environment map including environment information;

updating the environment map on a basis of the map base data;

creating first map base data having a first range and first resolution;

creating second map base data having a second range wider than the first range and second resolution lower than the first resolution, wherein the second map base data does not include at least a part of data in a region overlapping the first map base data;

updating a first environment map having a third range and the first resolution on a basis of the first map base data; and updating a second environment map having a fourth range wider than the third range and the second resolution on a basis of environment information in the first environment map and the second map base data; and autonomously moving a mobile object through an environment based on at least one of the first environment map or the second environment map.

10. A non-transitory computer-readable storage medium storing computer-readable instructions thereon which, when executed by a computer, causes the computer to perform a method, the method comprising:

acquiring sensor information acquired by a sensor sensing an environment around a mobile object;

analyzing the sensor information and creating map base data that is data used for updating an environment map that describes the environment around the mobile object and includes environment information recorded in association with each of a plurality of voxels of the environment map;

updating the environment map based on the map base data;

analyzing the environment map, to compensate for a missing part of the environment information in the environment map;

estimating content of a missing part of a predetermined kind of environment information in a first region of the environment map where the predetermined kind of environment information is missing by evaluating continuity of another kind of environment information in the environment map with a second region of the environment map where the predetermined kind of environment information is recorded;

providing the estimated content as compensation for the missing part-;

preparing action planning of the mobile object based on the environment map; and controlling an actuator to move the mobile object through the environment according to the action planning.

11. A non-transitory computer-readable storage medium storing computer-readable instructions thereon which, when executed by a computer, causes the computer to perform a method, the method comprising:

acquiring sensor information;

analyzing the sensor information and creating map base data that is data used for updating an environment map including environment information;

updating the environment map on a basis of the map base data;

creating first map base data having a first range and first resolution;

creating second map base data having a second range wider than the first range and second resolution lower than the first resolution, wherein the second map base data does not include at least a part of data in a region overlapping the first map base data;

updating a first environment map having a third range and the first resolution on a basis of the first map base data; and updating a second environment map having a fourth range wider than the third range and the second resolution on a basis of environment information in the first environment map and the second map base data; and autonomously moving a mobile object through an environment based on at least one of the first environment map or the second environment map.

* * * * *